(12) United States Patent
Kawamura et al.

(10) Patent No.: US 10,761,313 B2
(45) Date of Patent: Sep. 1, 2020

(54) EYEPIECE LENS, OBSERVATION APPARATUS, AND IMAGING APPARATUS INCLUDING THE SAME

(71) Applicant: CANON KABUSHIKI KAISHA, Tokyo (JP)

(72) Inventors: Jun Kawamura, Utsunomiya (JP); Nobuyuki Miyazawa, Utsunomiya (JP); Yu Inomoto, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 825 days.

(21) Appl. No.: 14/832,953

(22) Filed: Aug. 21, 2015

(65) Prior Publication Data

US 2016/0062105 A1    Mar. 3, 2016

(30) Foreign Application Priority Data

Aug. 29, 2014 (JP) ................. 2014-176291
Aug. 29, 2014 (JP) ................. 2014-176293
Aug. 29, 2014 (JP) ................. 2014-176294
Aug. 29, 2014 (JP) ................. 2014-176295

(51) Int. Cl.
*G02B 25/00* (2006.01)

(52) U.S. Cl.
CPC ................. *G02B 25/001* (2013.01)

(58) Field of Classification Search
CPC ................. G02B 25/001; G02B 9/60
USPC ................. 359/642–830
See application file for complete search history.

(56) References Cited

U.S. PATENT DOCUMENTS

| | | | |
|---|---|---|---|
| 1,479,229 A | | 1/1924 | Erfle |
| 2,313,460 A | | 3/1943 | Warmisham |
| 3,586,418 A | * | 6/1971 | Abe ............ G02B 25/001 359/644 |
| 3,862,796 A | | 1/1975 | De Jager |
| 5,162,945 A | | 11/1992 | Matsuo et al. |
| 5,691,850 A | | 11/1997 | Arisaka |
| 5,701,475 A | | 12/1997 | Sugawara |
| 5,726,808 A | | 3/1998 | Suzuki |
| 5,969,873 A | * | 10/1999 | Sugawara ...... G02B 25/001 359/643 |

(Continued)

FOREIGN PATENT DOCUMENTS

| CN | 101389994 A | 3/2009 |
|---|---|---|
| CN | 101490595 A | 7/2009 |

(Continued)

OTHER PUBLICATIONS

Leuchs, et al. "Time reversal symmetry in optics" (Year: 2012).*

*Primary Examiner* — Mahidere S Sahle
(74) *Attorney, Agent, or Firm* — Canon U.S.A., Inc. IP Division

(57) ABSTRACT

One or more eyepiece lenses, one or more observation apparatuses and one or more imaging apparatuses are discussed herein. In at least one embodiment, an eyepiece lens comprises, in order from an object side to an observation side, a first lens having a positive refractive power, a second lens having a negative refractive power, a third lens having a positive refractive power, a fourth lens having a negative refractive power, and a fifth lens having a positive refractive power, wherein a focal length of the fifth lens is shorter than a focal length of the third lens, and the focal length of the third lens is shorter than a focal length of the first lens.

10 Claims, 28 Drawing Sheets

(56) References Cited

U.S. PATENT DOCUMENTS

| | | |
|---|---|---|
| 2005/0230599 A1 | 10/2005 | Orino |
| 2009/0310220 A1 | 12/2009 | Suzuki |
| 2011/0134266 A1* | 6/2011 | Mihara .................. G02B 13/18 348/222.1 |
| 2011/0242397 A1* | 10/2011 | Miyazawa ........... G02B 25/001 348/333.09 |
| 2012/0250161 A1* | 10/2012 | Yanai ................... G02B 15/177 359/682 |
| 2013/0242412 A1* | 9/2013 | Uchida ............. G02B 13/0045 359/714 |
| 2013/0342918 A1* | 12/2013 | Kubota ............. G02B 13/0045 359/713 |
| 2014/0139933 A1* | 5/2014 | Chen ....................... G02B 9/60 359/714 |
| 2015/0192760 A1 | 7/2015 | Huang |
| 2016/0062104 A1 | 3/2016 | Kimura et al. |

FOREIGN PATENT DOCUMENTS

| | | |
|---|---|---|
| CN | 101806956 A | 8/2010 |
| CN | 102483512 A | 5/2012 |
| CN | 202221491 U | 5/2012 |
| CN | 103376536 A | 10/2013 |
| CN | 103837965 A | 6/2014 |
| JP | 09-005644 A | 1/1997 |
| JP | 11-133317 A | 5/1999 |
| JP | 2000-111812 A | 4/2000 |
| JP | 2001-272610 A | 10/2001 |
| JP | 3306134 B2 | 7/2002 |
| JP | 2009-271385 A | 11/2009 |
| JP | 2013-045020 A | 3/2013 |
| JP | 2013-250506 A | 12/2013 |
| JP | 2015-034925 A | 2/2015 |
| WO | 2013/027855 A1 | 2/2013 |
| WO | 2014/041773 A1 | 3/2014 |

* cited by examiner

FIG.1
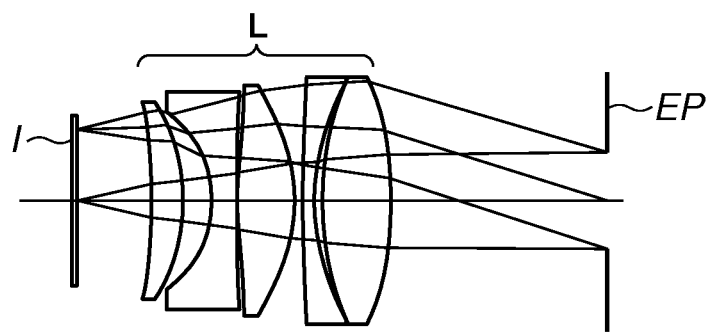
REFERENCE
STATE
- 2.0 [diopter]
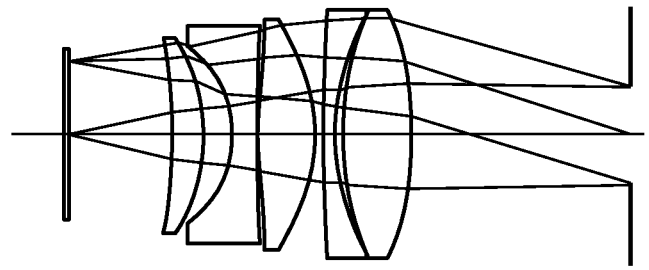
+ 2.5 [diopter]
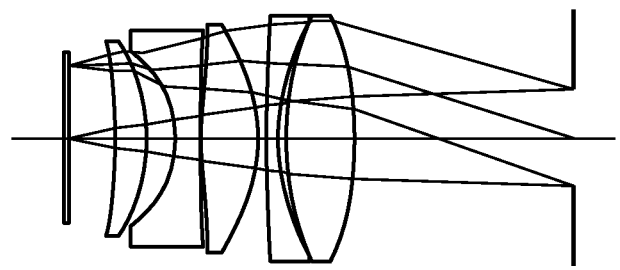
- 6.0 [diopter]

FIG.7
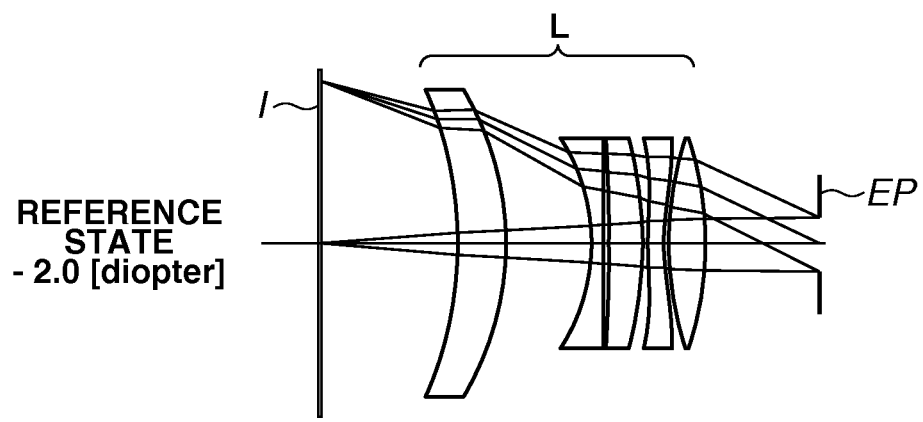
REFERENCE STATE
− 2.0 [diopter]
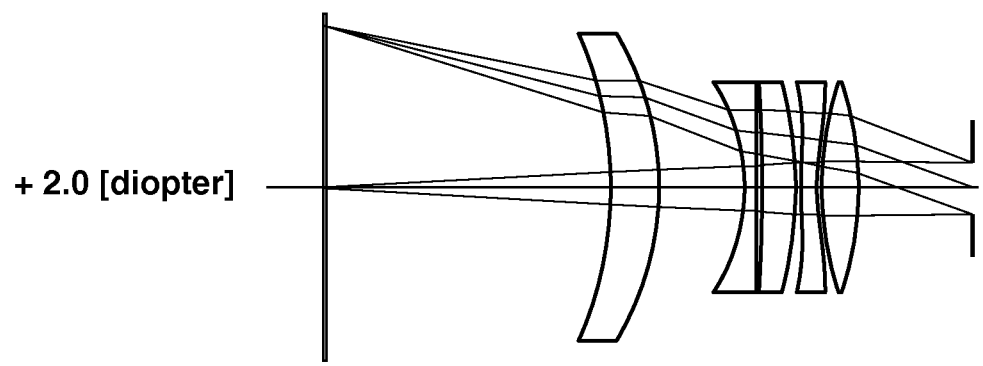
+ 2.0 [diopter]
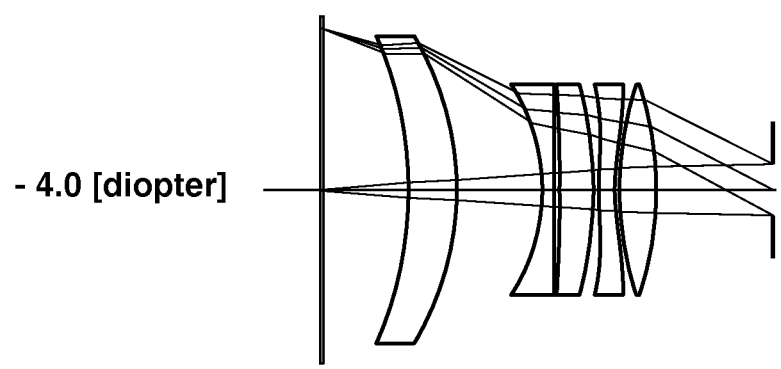
− 4.0 [diopter]

FIG.11
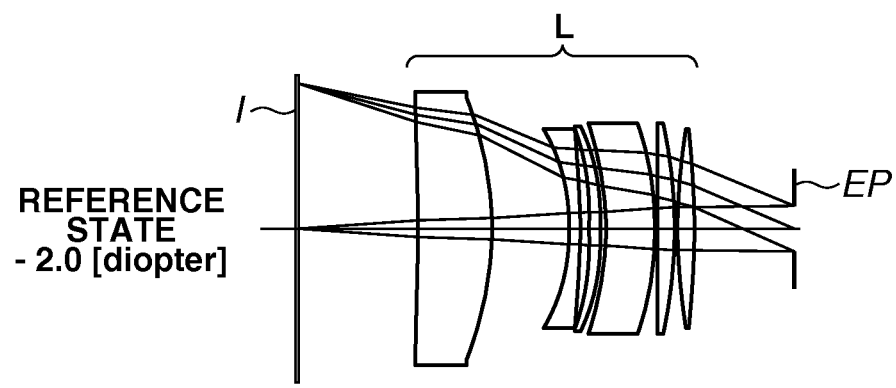
REFERENCE
STATE
− 2.0 [diopter]
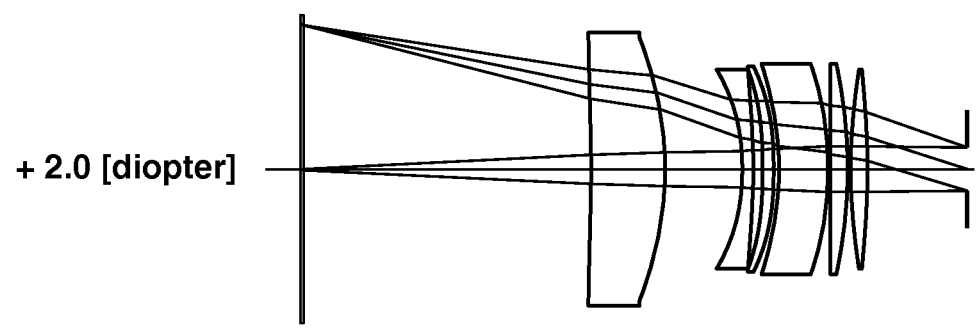
+ 2.0 [diopter]
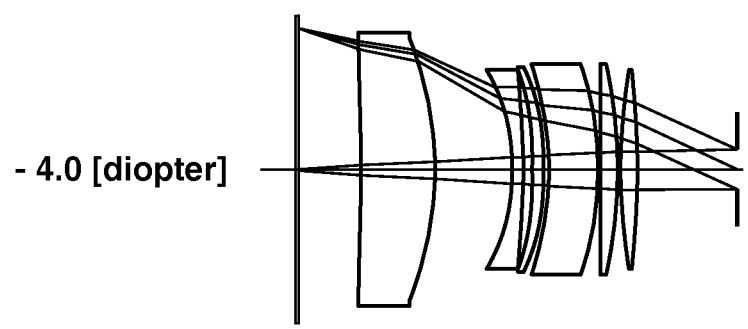
− 4.0 [diopter]

EYEPIECE LENS, OBSERVATION APPARATUS, AND IMAGING APPARATUS INCLUDING THE SAME

BACKGROUND OF THE INVENTION

Field of the Invention

The present disclosure relates to an eyepiece lens, and an observation apparatus and an imaging apparatus including an eyepiece lens, and the eyepiece lens, and the observation apparatus and the imaging apparatus including the eyepiece lens, are well adaptable to observe an image displayed on an image display device in an electronic viewfinder used for an optical device or a camera, such as, a video camera, a still camera, or a broadcasting camera, for example.

Description of the Related Art

An electronic viewfinder used in an optical device such as a video camera or a broadcasting camera has conventionally used an eyepiece lens to enlarge and observe an image displayed on a liquid crystal screen provided in the camera.

Recently, with an increase in functions of an imaging apparatus, an electronic viewfinder having a wide visual field and capable of largely displaying an image has been demanded. As a method for achieving such demand, a method of increasing an image display surface such as a liquid crystal screen, or a method of increasing an observation magnification of an eyepiece lens, has been known.

However, a large image display surface increases the size of the viewfinder. To downsize the overall viewfinder, the observation magnification of the eyepiece lens is preferably increased. To increase the observation magnification of the eyepiece lens, the positive refractive power of the eyepiece lens needs to be high. At this time, if the eyepiece lens is constituted by only lenses with a positive refractive power (positive lenses), axial chromatic aberration and lateral chromatic aberration are greatly generated, and it becomes difficult to correct these aberrations. To obtain a high-definition observation image with an observation magnification of an eyepiece lens being increased, an eyepiece lens is desirably configured by using a lens having a negative refractive power (negative lens) in addition to a positive lens. With this configuration, an observation image in which axial chromatic aberration and lateral chromatic aberration are satisfactorily corrected can be obtained.

In addition, a finder which has a long eye relief and which can be used by a user with glasses has been demanded.

Japanese Patent Application Laid-Open No. 2001-272610 discusses an eyepiece lens which is constituted by a positive lens, a negative lens, a positive lens, a negative lens, and a positive lens sequentially from an image display surface side to an observation side (eye point side). This application aims to implement an eyepiece lens having a short focal length and long eye relief by using a plurality of positive lenses.

Japanese Patent No. 3306134 discusses an eyepiece lens which is constituted by a positive lens, a positive lens, a negative lens, a positive lens, and a positive lens sequentially from an image display surface side to an observation side (eye point side). This patent aims to increase an angle of view by using four positive lenses.

As described above, an eyepiece lens including five lenses as a whole has been known. The eyepiece lens includes at least one positive lens and one negative lens for implementing a long eye relief and wide angle of view.

In the eyepiece lens discussed in Japanese Patent Application Laid-Open No. 2001-272610, the positive lens (second positive lens) that is arranged second from the image display surface out of the three positive lenses has the highest refractive power, and it is difficult to satisfactorily correct coma and high-order aberration generated in the second lens.

In the eyepiece lens discussed in Japanese Patent No. 3306134, four of the five lenses are positive lenses, and it is difficult to satisfactorily correct axial chromatic aberration and lateral chromatic aberration.

SUMMARY OF THE INVENTION

According to an aspect of the present disclosure, an eyepiece lens, in order from an object side to an observation side, includes a first lens having a positive refractive power, a second lens having a negative refractive power, a third lens having a positive refractive power, a fourth lens having a negative refractive power, and a fifth lens having a positive refractive power, wherein a focal length of the fifth lens is shorter than a focal length of the third lens, and the focal length of the third lens is shorter than a focal length of the first lens.

According to another aspect of the present disclosure, an eyepiece lens includes, in order from an object side to an observation side, a first lens having a positive refractive power, a second lens having a negative refractive power, a third lens having a positive refractive power, and a fourth lens having a negative refractive power, wherein the following conditional expression is satisfied:

$$-12.00<(R21+R32)/(R21-R32)<-3.00,$$

where a curvature radius of an object-side lens surface of the second lens is defined as R21, and a curvature radius of an observation-side lens surface of the third lens is defined as R32.

According to yet another aspect of the present disclosure, an eyepiece lens includes five or more lenses including a lens having a positive refractive power arranged at the most object side, a lens having a positive refractive power arranged at the most observation side, and a lens having a negative refractive power, wherein the following conditional expression is satisfied:

$$0.58<fe/f<0.95,$$

where a focal length of the eyepiece lens is defined as f, and a focal length of the lens arranged at the most observation side is defined as fe.

According to yet another aspect of the present disclosure, an eyepiece lens includes five or more lenses including three or more lenses each of which has a lens surface with an aspheric shape rotationally symmetric about an optical axis.

According to other aspects of the present disclosure, one or more additional eyepiece lenses, and one or more observation apparatuses and one or more imaging apparatuses including an eyepiece lens are discussed herein. Further features of the present disclosure will become apparent from the following description of exemplary embodiments with reference to the attached drawings.

BRIEF DESCRIPTION OF THE DRAWINGS

FIG. 1 is a lens cross-sectional view of an eyepiece lens according to a first exemplary embodiment.

FIG. 7 is a lens cross-sectional view of an eyepiece lens according to a fourth exemplary embodiment.

FIG. 11 is a lens cross-sectional view of an eyepiece lens according to a sixth exemplary embodiment.

DESCRIPTION OF THE EMBODIMENTS

At least one eyepiece lens according to exemplary embodiments of the present disclosure, and an observation apparatus and an imaging apparatus including at least one embodiment of an eyepiece lens will be described in detail below with reference to the accompanying drawings.

Figure 2:
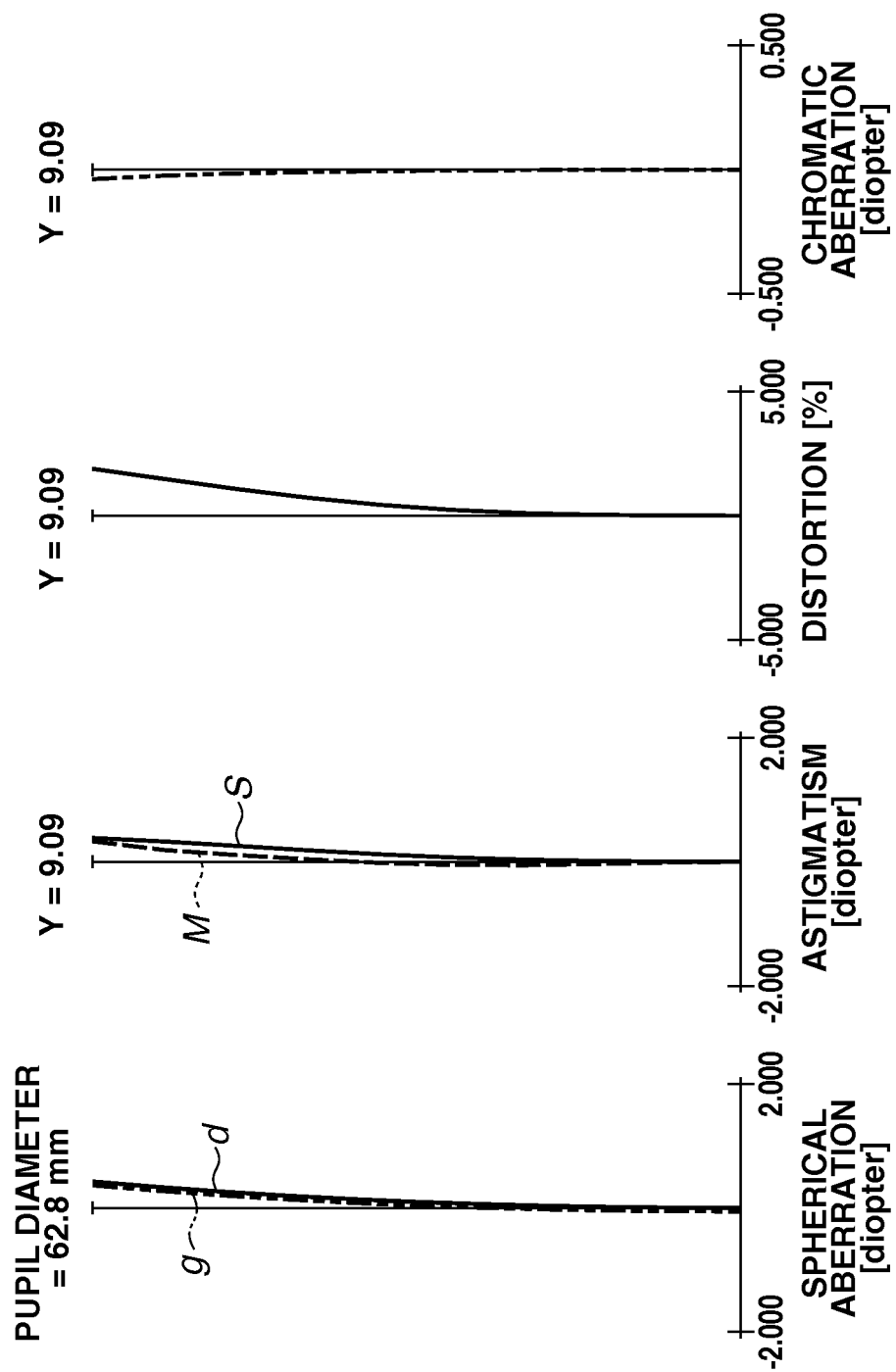
FIG. 2 illustrates aberration diagrams of the eyepiece lens according to the first exemplary embodiment.
Figure 3:
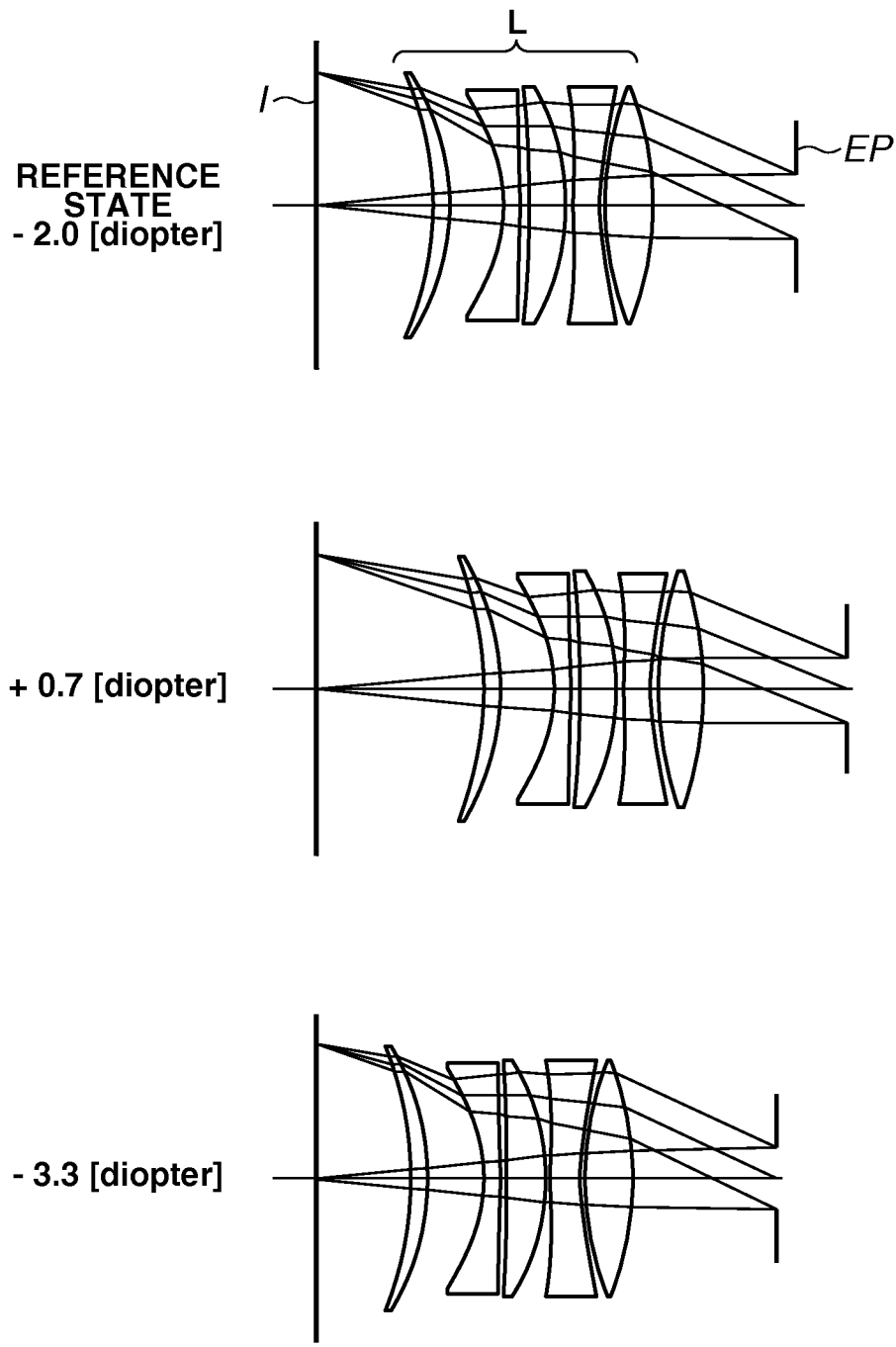
FIG. 3 is a lens cross-sectional view of an eyepiece lens according to a second exemplary embodiment.
Figure 4:
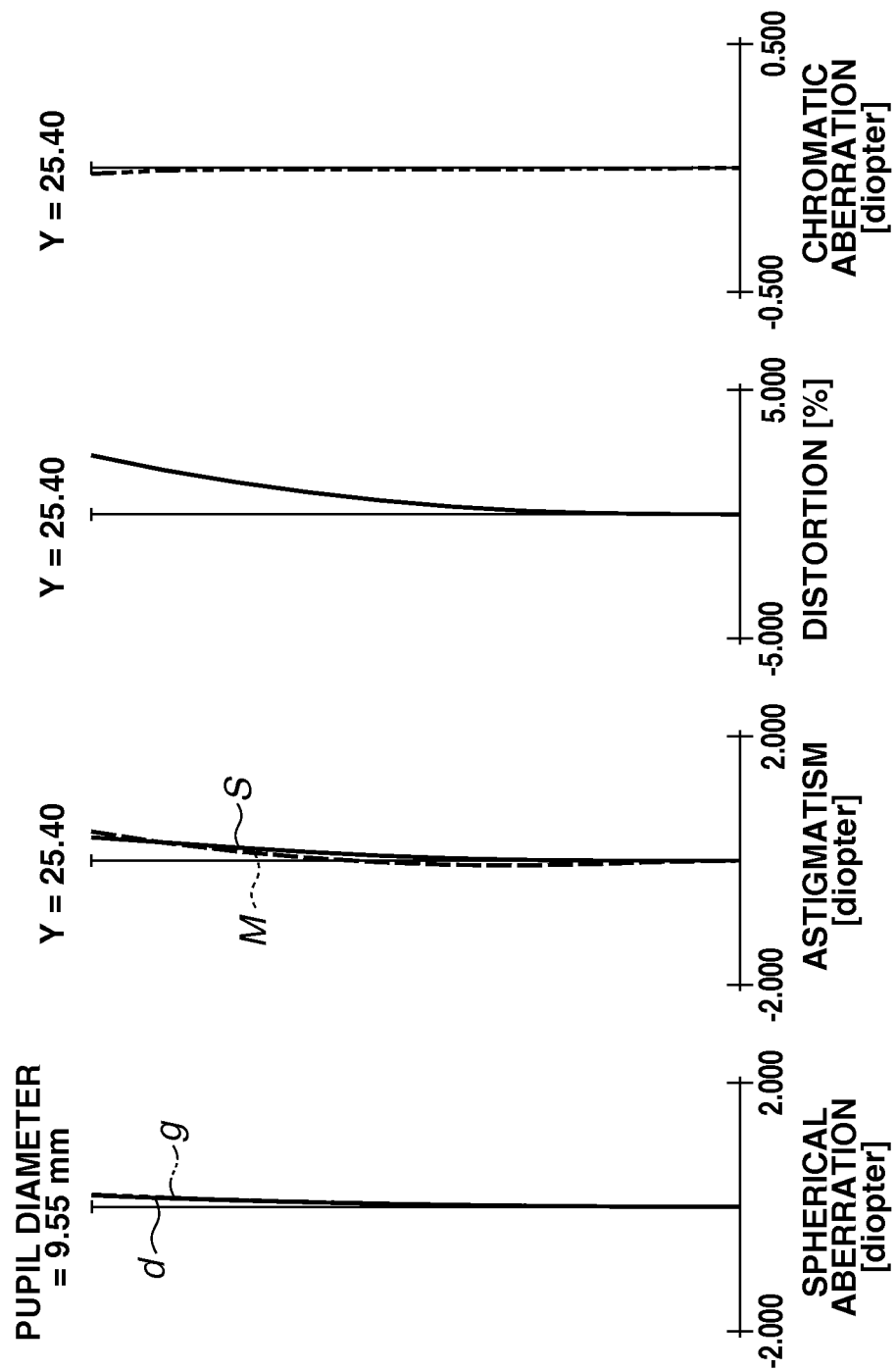
FIG. 4 illustrates aberration diagrams of the eyepiece lens according to the second exemplary embodiment.

FIG. 1 is a lens cross-sectional view of an eyepiece lens according to a first exemplary embodiment, when the diopter of the eyepiece lens is −2.0 (reference state), 2.5, and −6.0. FIG. 2 illustrates aberration diagrams of the eyepiece lens in the reference state according to the first exemplary embodiment. FIG. 3 is a lens cross-sectional view of an eyepiece lens according to a second exemplary embodiment, when the diopter of the eyepiece lens is −2.0 (reference state), 0.7, and −3.3. FIG. 4 illustrates aberration diagrams of the eyepiece lens in the reference state according to the second exemplary embodiment.

Figure 5:
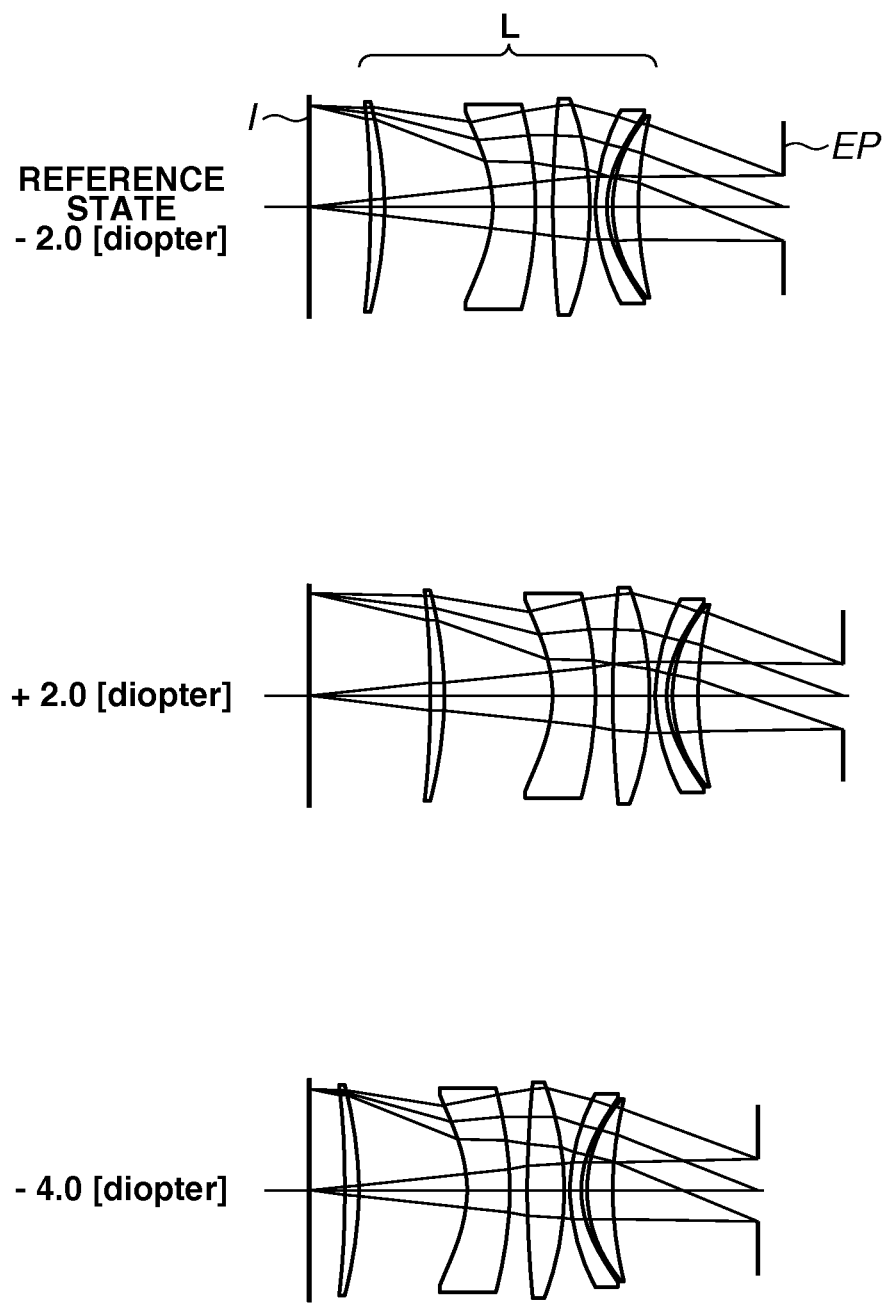
FIG. 5 is a lens cross-sectional view of an eyepiece lens according to a third exemplary embodiment.
Figure 6:
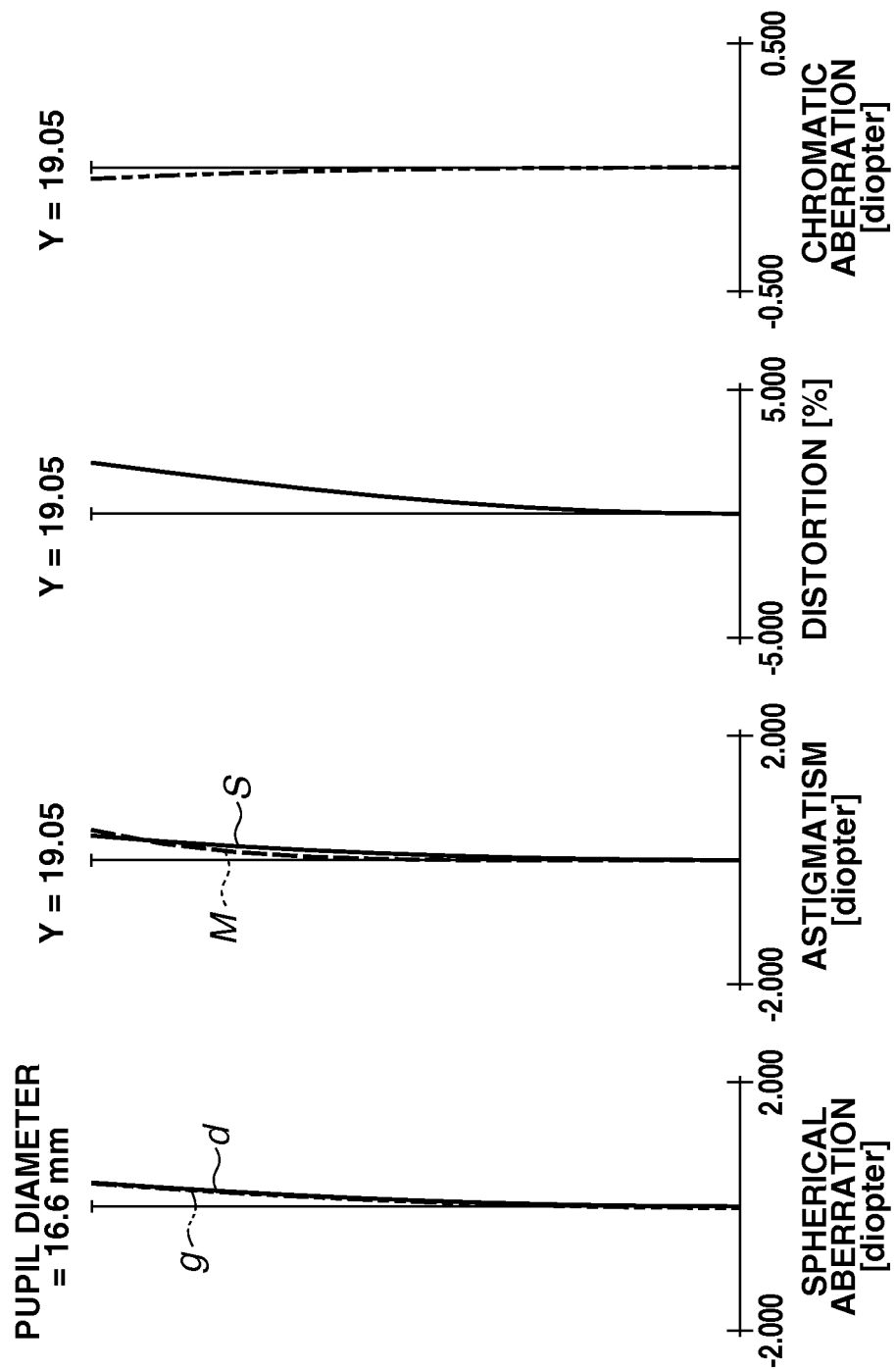
FIG. 6 illustrates aberration diagrams of the eyepiece lens according to the third exemplary embodiment.
Figure 8:
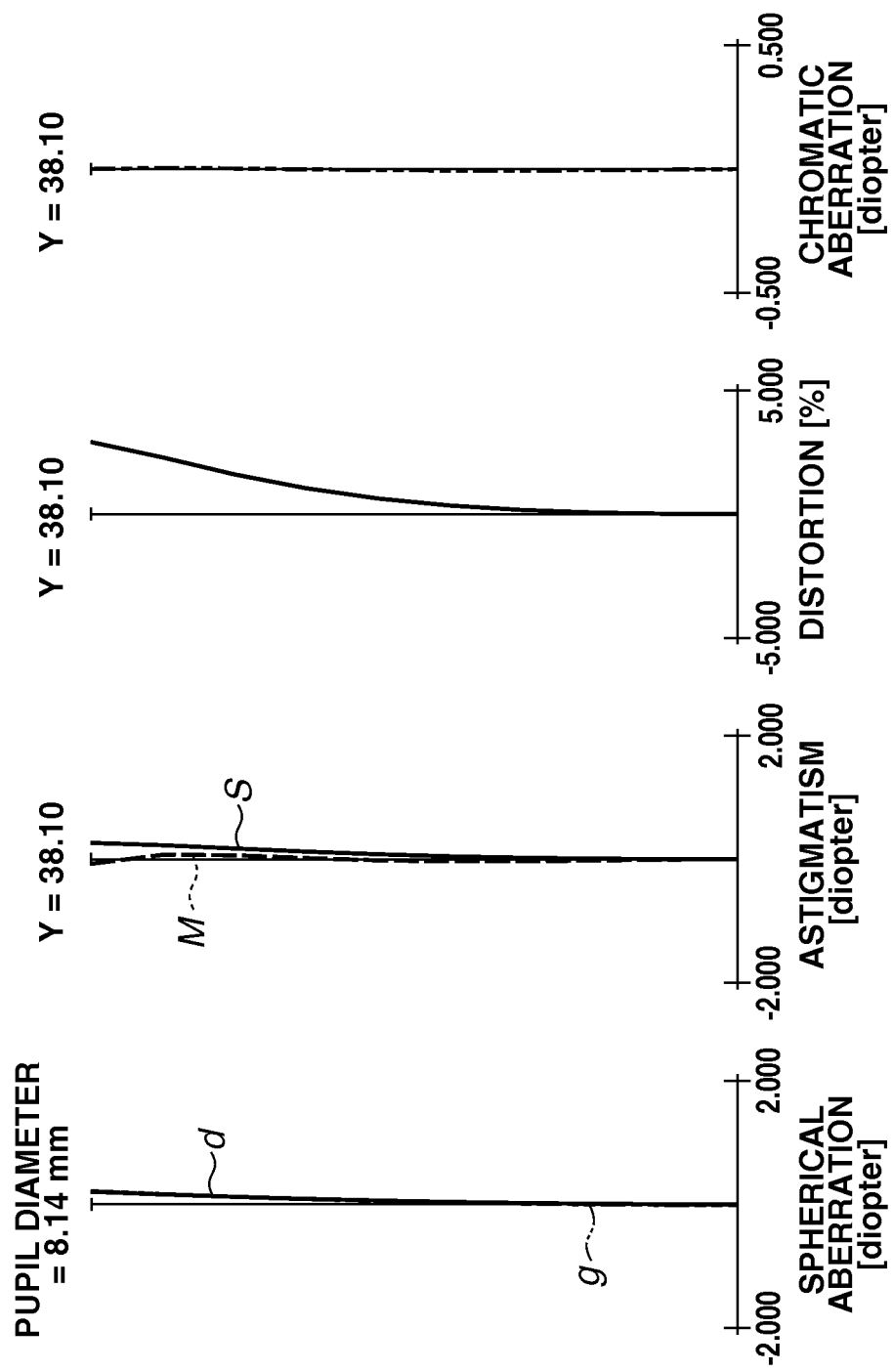
FIG. 8 illustrates aberration diagrams of the eyepiece lens according to the fourth exemplary embodiment.

FIG. 5 is a lens cross-sectional view of an eyepiece lens according to a third exemplary embodiment, when the diopter of the eyepiece lens is −2.0 (reference state), 2.0, and −4.0. FIG. 6 illustrates aberration diagrams of the eyepiece lens in the reference state according to the third exemplary embodiment. FIG. 7 is a lens cross-sectional view of an eyepiece lens according to a fourth exemplary embodiment, when the diopter of the eyepiece lens is −2.0 (reference state), 2.0, and −4.0. FIG. 8 illustrates aberration diagrams of the eyepiece lens in the reference state according to the fourth exemplary embodiment.

Figure 9:
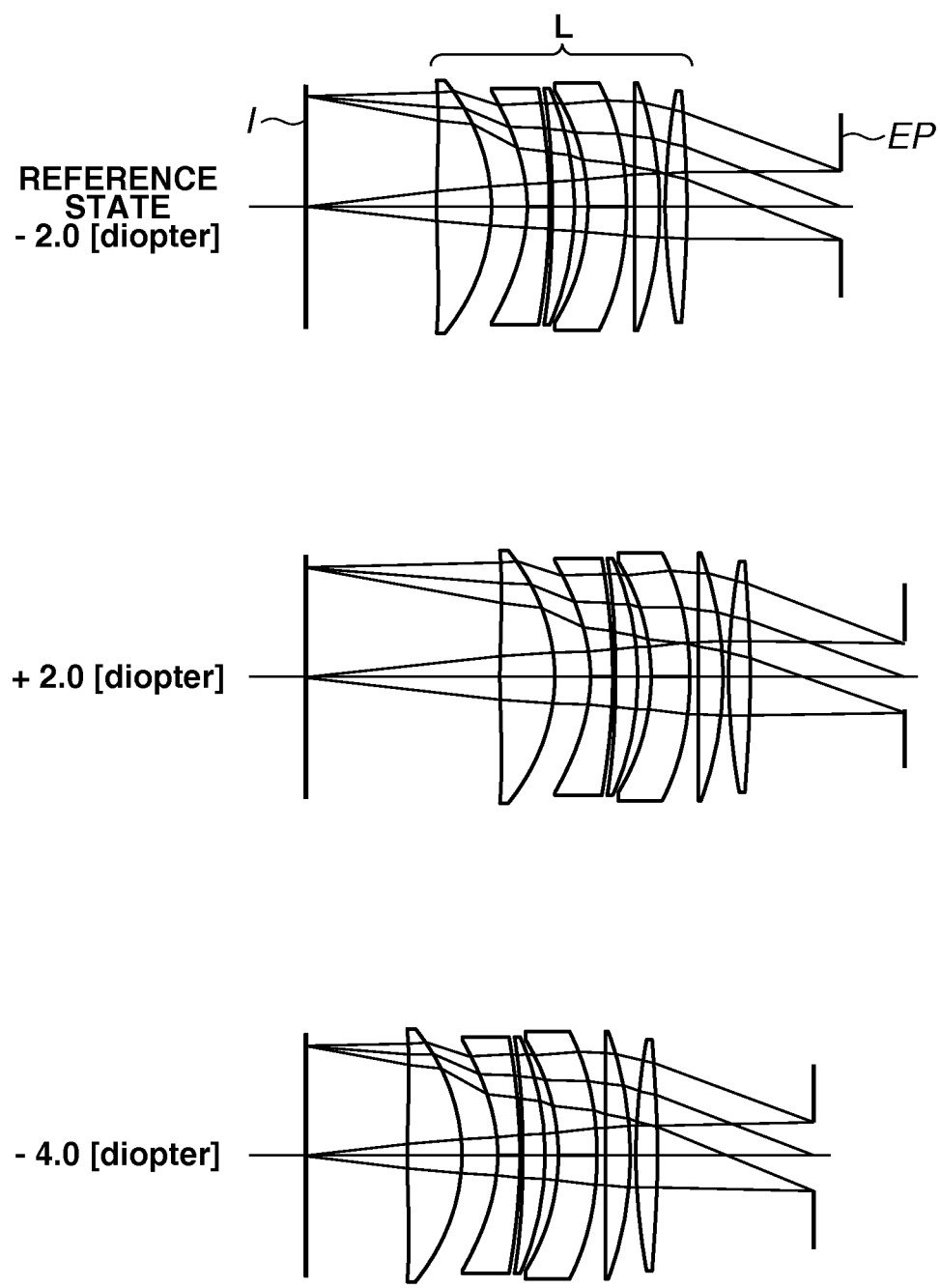
FIG. 9 is a lens cross-sectional view of an eyepiece lens according to a fifth exemplary embodiment.
Figure 10:
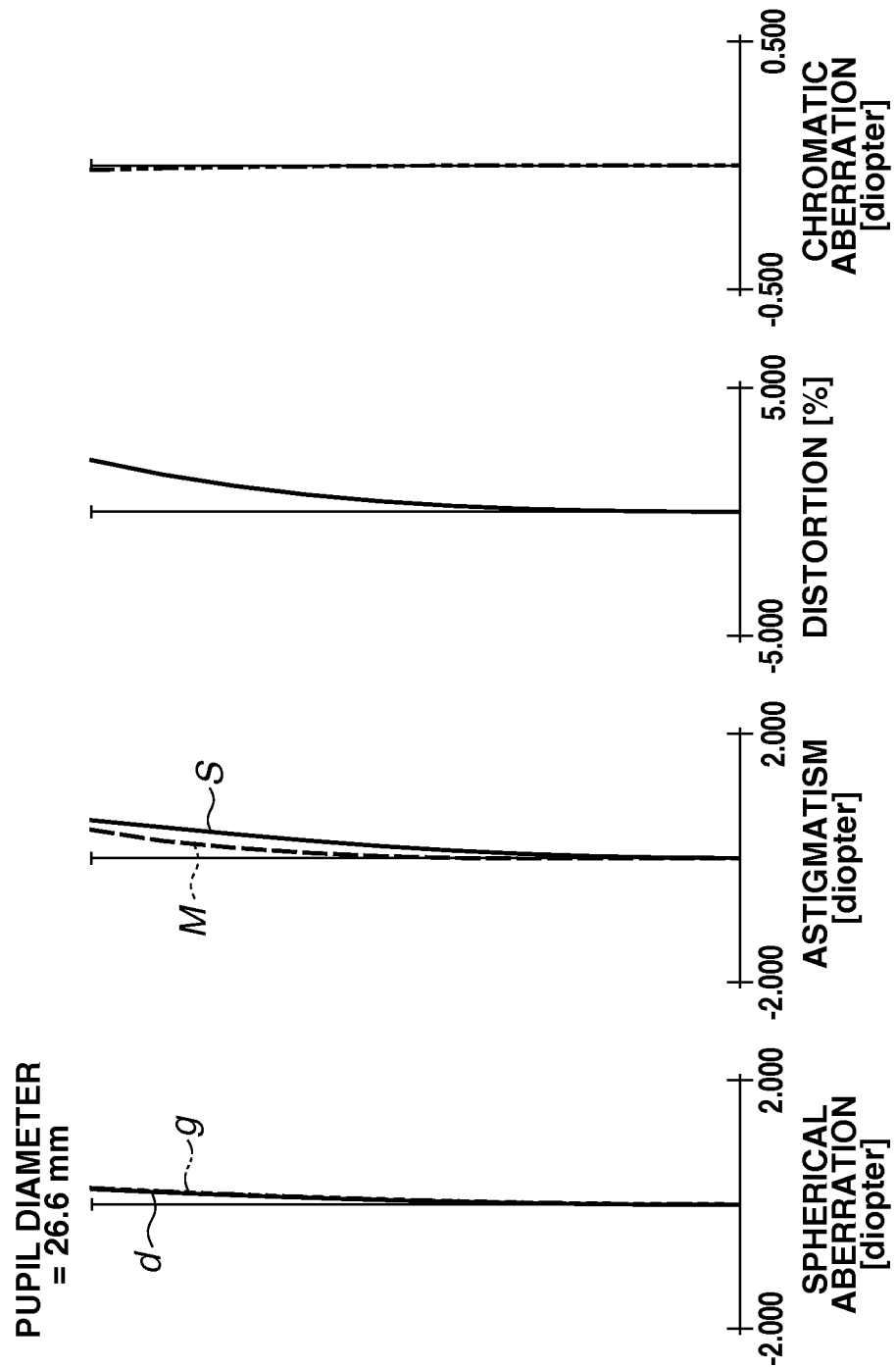
FIG. 10 illustrates aberration diagrams of the eyepiece lens according to the fifth exemplary embodiment.
Figure 12:
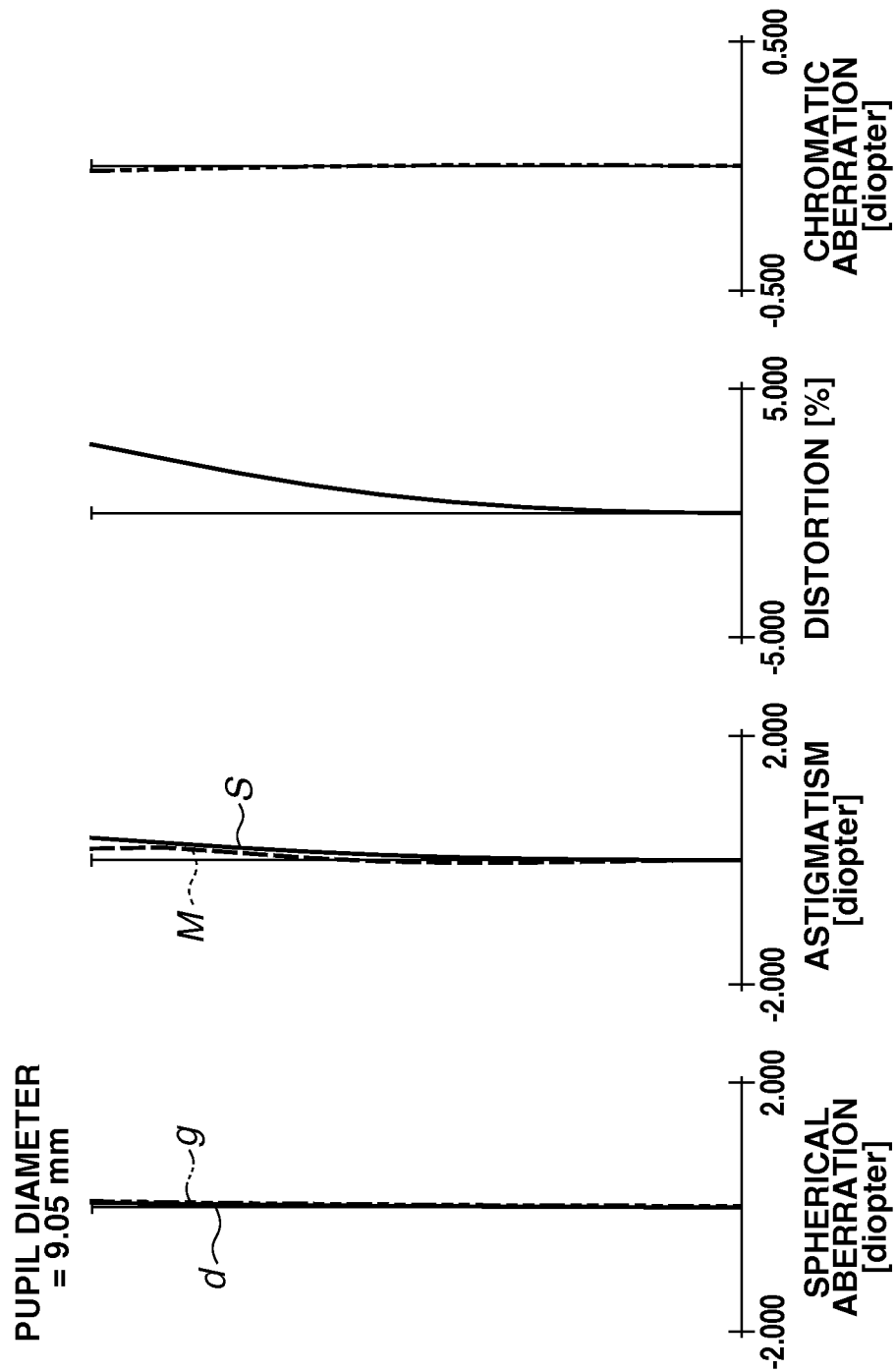
FIG. 12 illustrates aberration diagrams of the eyepiece lens according to the sixth exemplary embodiment.

FIG. 9 is a lens cross-sectional view of an eyepiece lens according to a fifth exemplary embodiment, when the diopter of the eyepiece lens is −2.0 (reference state), 2.0, and −4.0. FIG. 10 illustrates aberration diagrams of the eyepiece lens in the reference state according to the fifth exemplary embodiment. FIG. 11 is a lens cross-sectional view of an eyepiece lens according to a sixth exemplary embodiment, when the diopter of the eyepiece lens is −2.0 (reference state), 2.0, and −4.0. FIG. 12 illustrates aberration diagrams of the eyepiece lens in the reference state according to the sixth exemplary embodiment.

Figure 13:
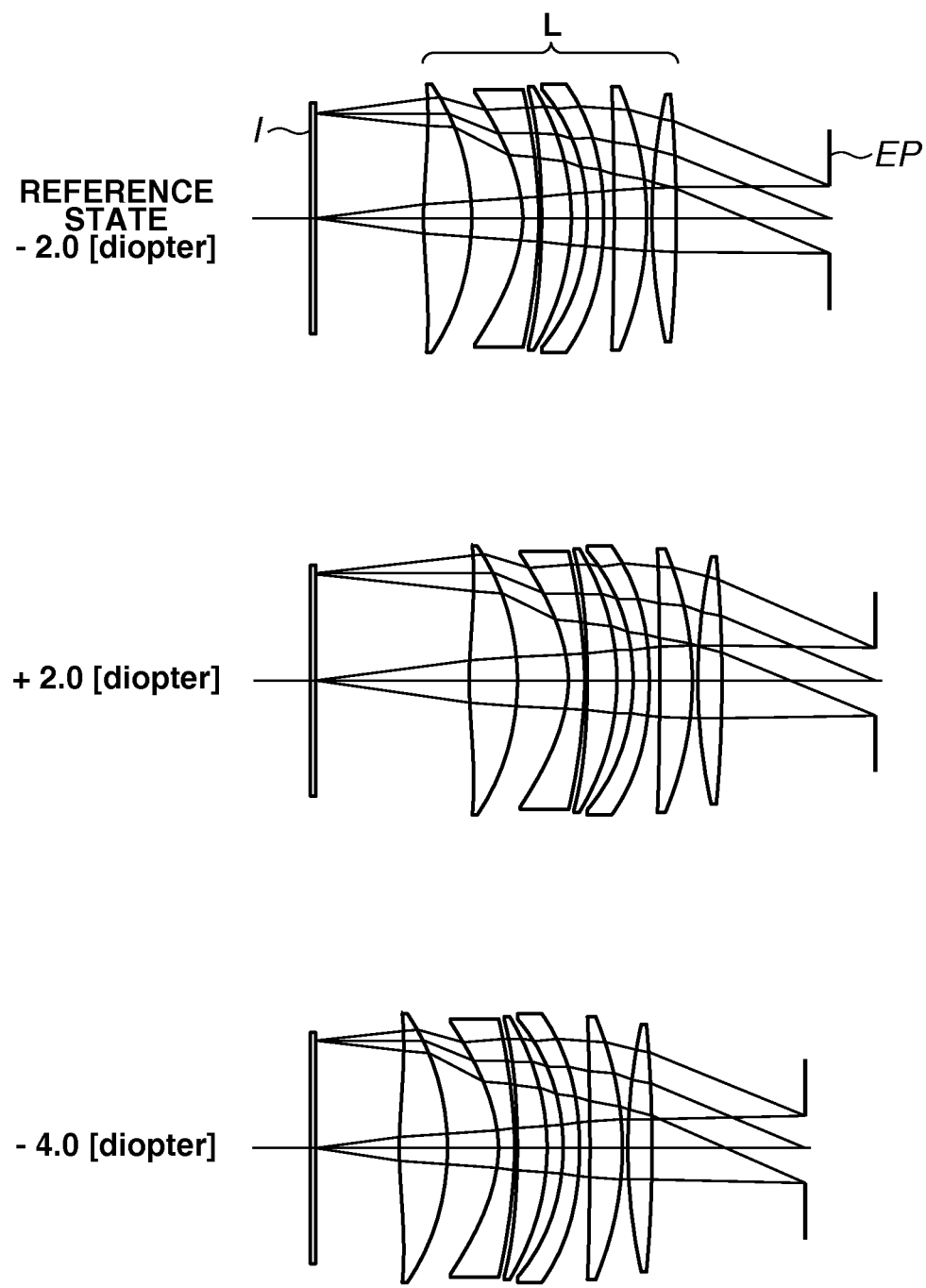
FIG. 13 is a lens cross-sectional view of an eyepiece lens according to a seventh exemplary embodiment.
Figure 14:
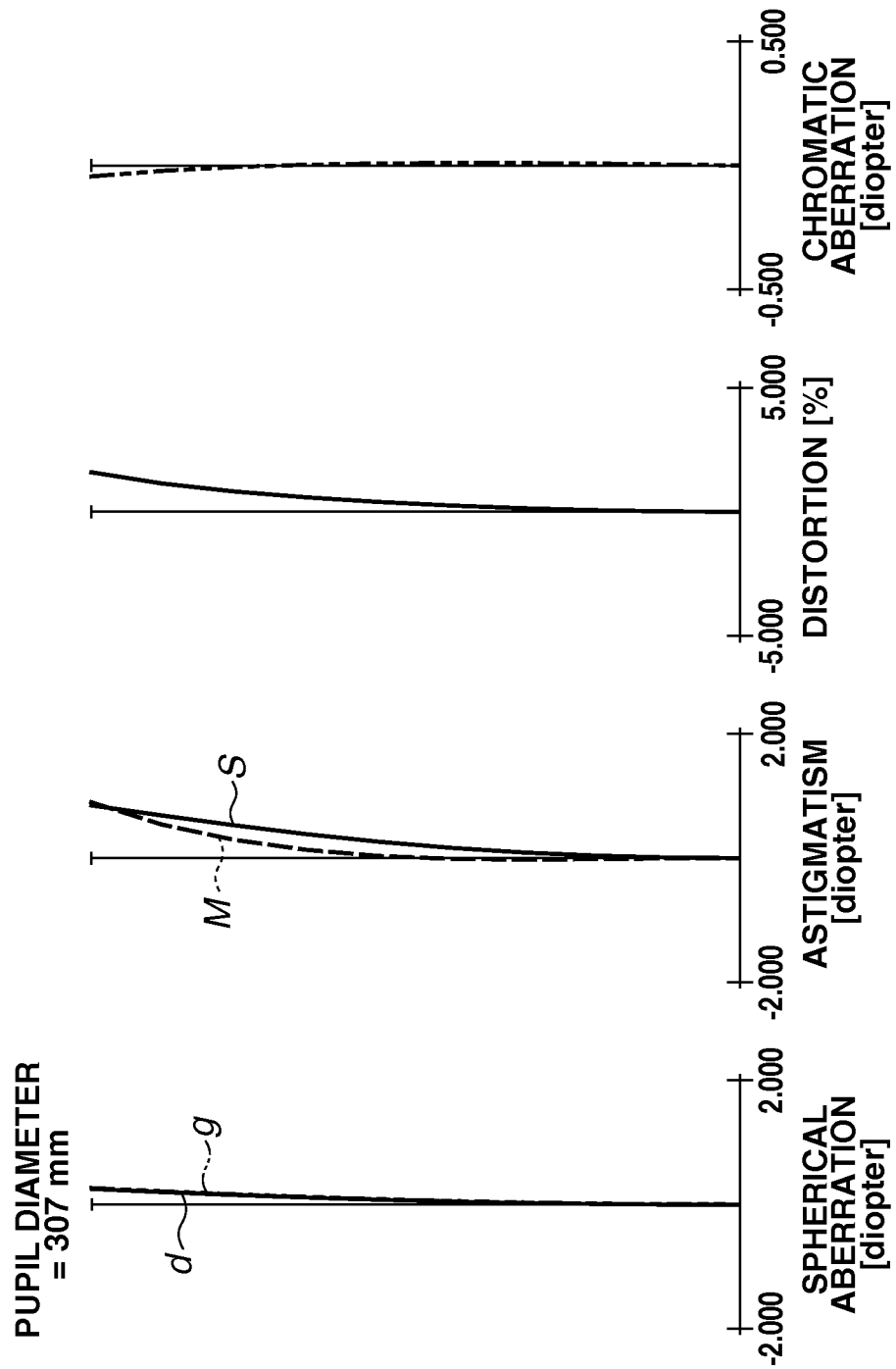
FIG. 14 illustrates aberration diagrams of the eyepiece lens according to the seventh exemplary embodiment.
Figure 15:
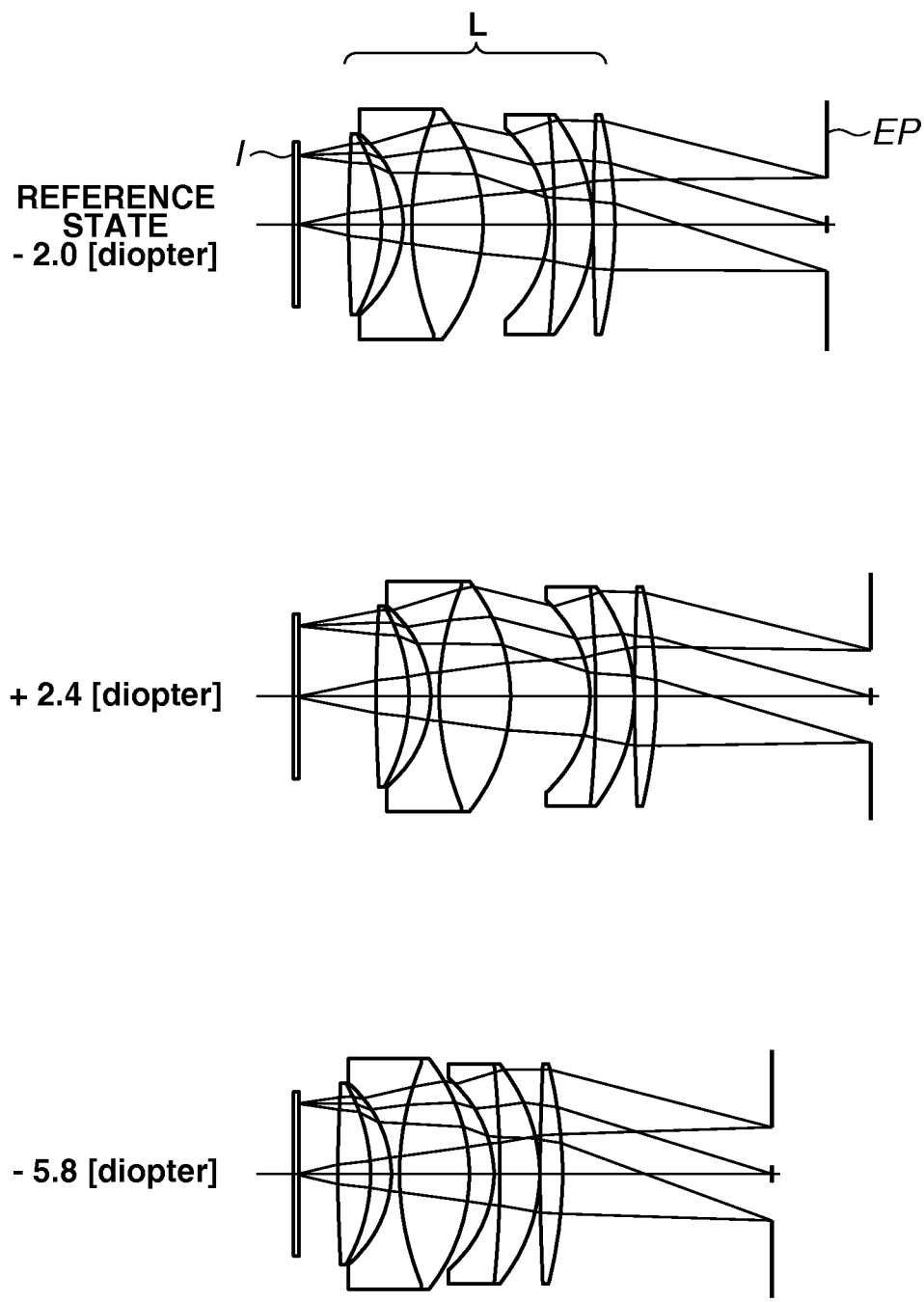
FIG. 15 is a lens cross-sectional view of an eyepiece lens according to an eighth exemplary embodiment.
Figure 16:
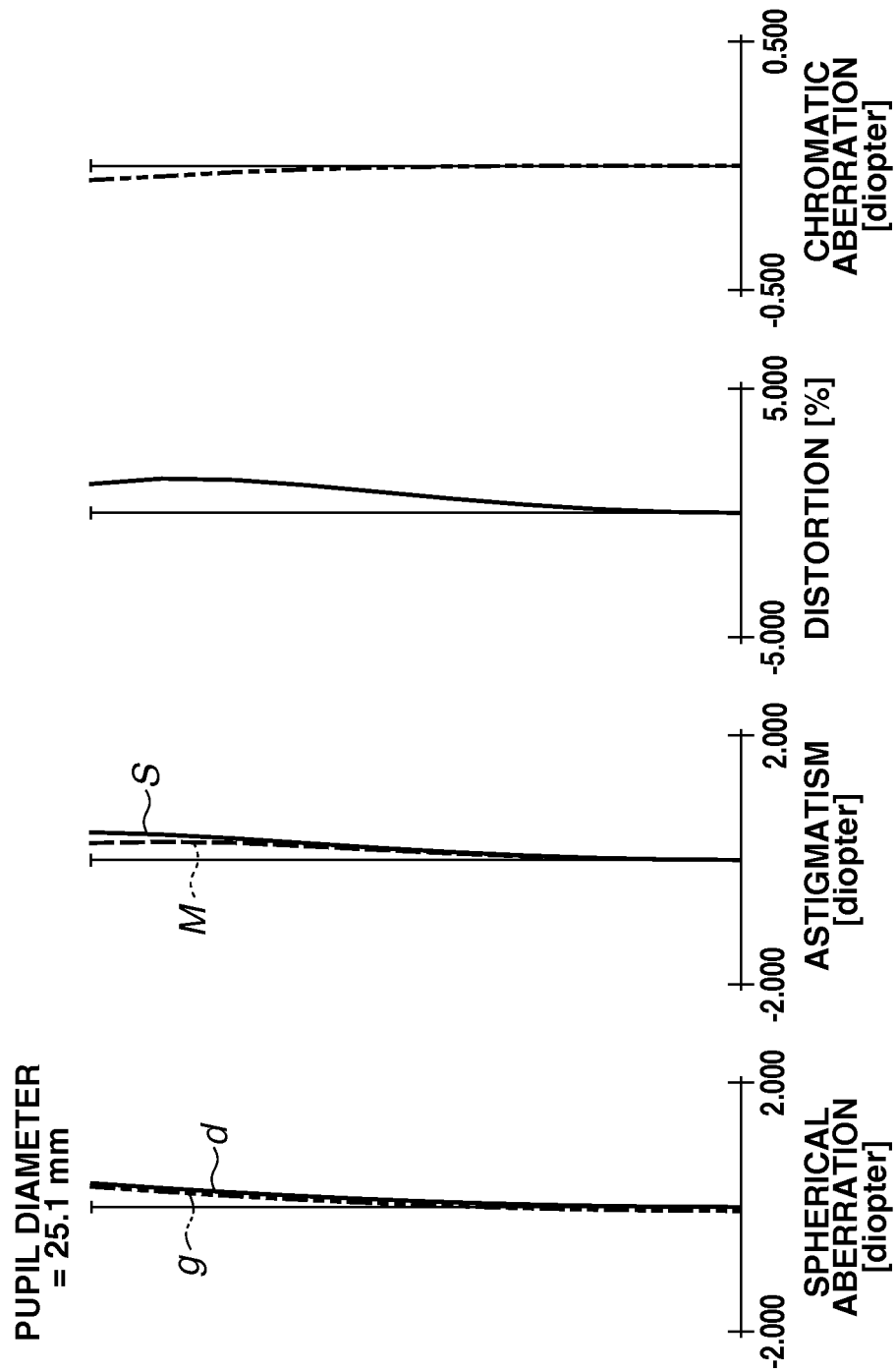
FIG. 16 illustrates aberration diagrams of the eyepiece lens according to the eighth exemplary embodiment.

FIG. 13 is a lens cross-sectional view of an eyepiece lens according to a seventh exemplary embodiment, when the diopter of the eyepiece lens is −2.0 (reference state), 2.0, and −4.0. FIG. 14 illustrates aberration diagrams of the eyepiece lens in the reference state according to the seventh exemplary embodiment. FIG. 15 is a lens cross-sectional view of an eyepiece lens according to an eighth exemplary embodiment, when the diopter of the eyepiece lens is −2.0 (reference state), 2.4, and −5.8. FIG. 16 illustrates aberration diagrams of the eyepiece lens in the reference state according to the eighth exemplary embodiment.

Figure 17:
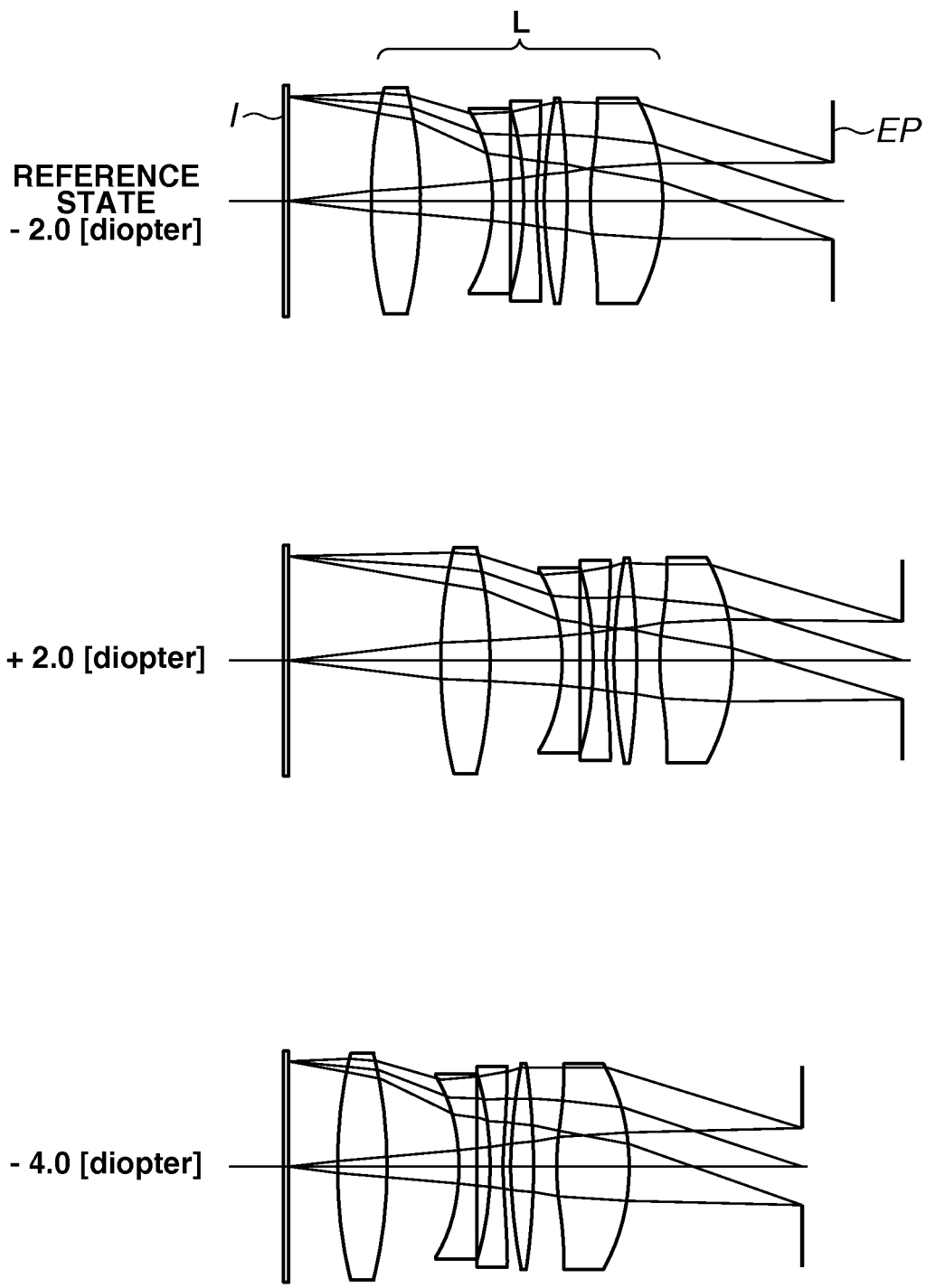
FIG. 17 is a lens cross-sectional view of an eyepiece lens according to a ninth exemplary embodiment.
Figure 18:
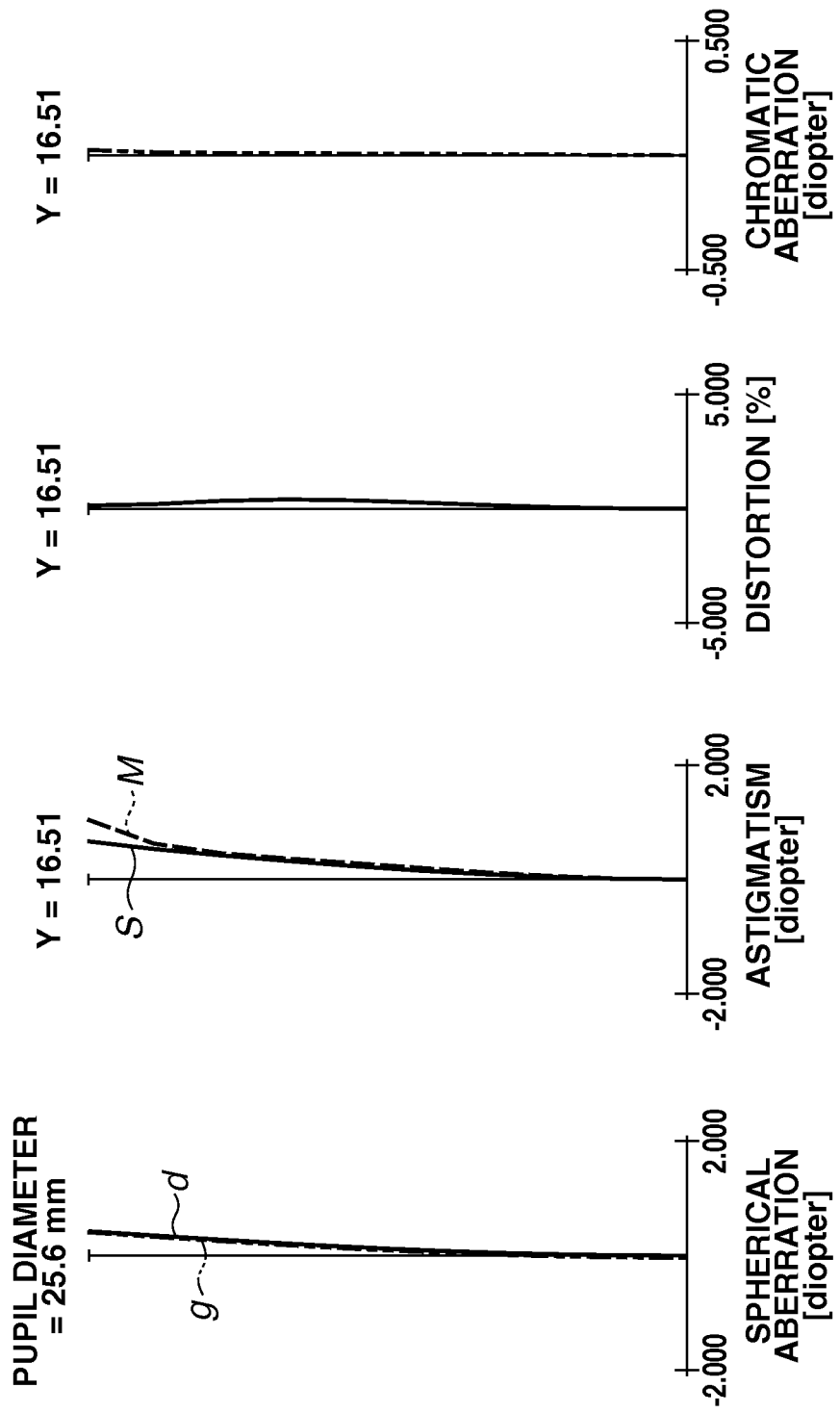
FIG. 18 illustrates aberration diagrams of the eyepiece lens according to the ninth exemplary embodiment.
Figure 19:
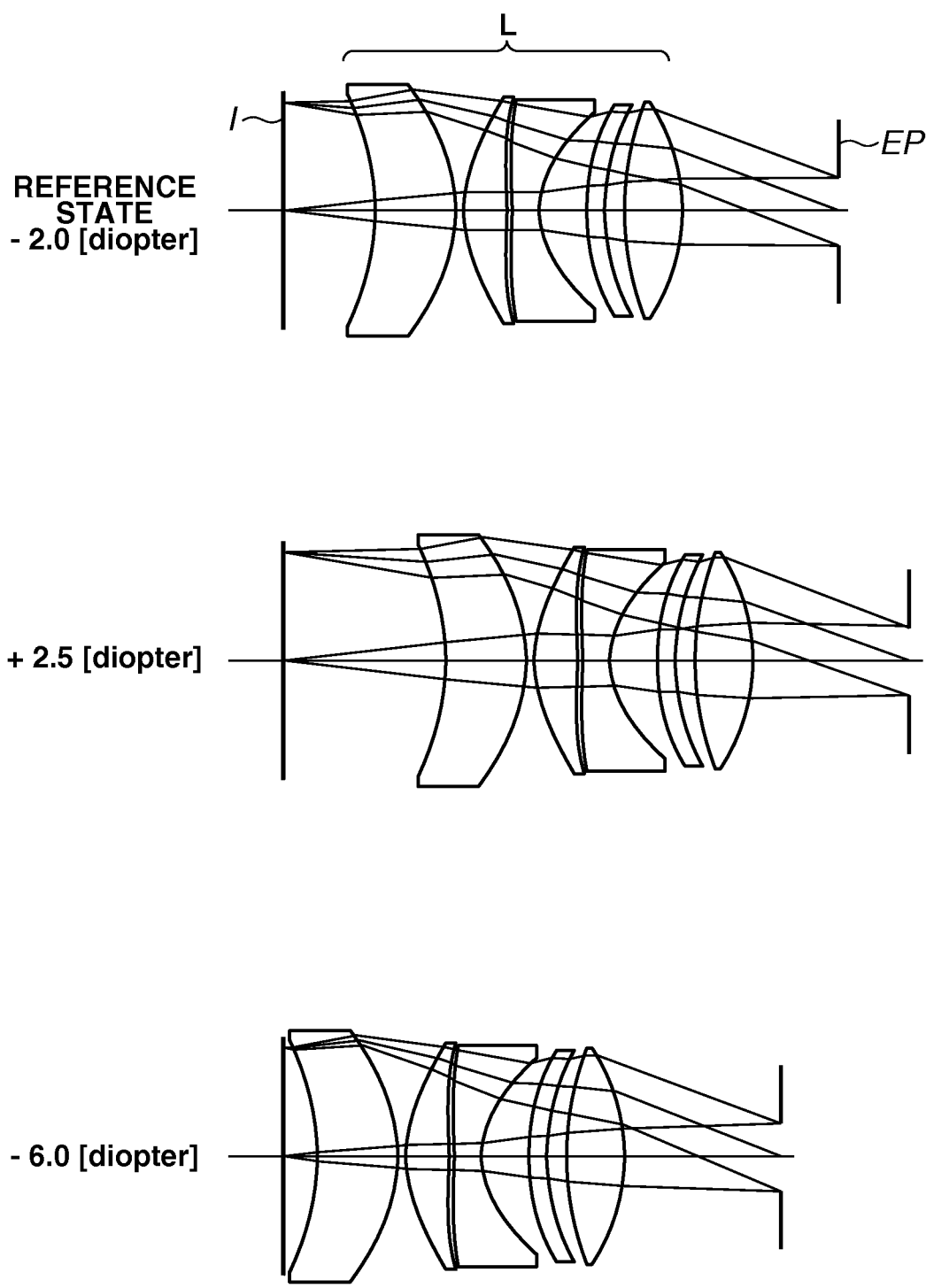
FIG. 19 is a lens cross-sectional view of an eyepiece lens according to a tenth exemplary embodiment.
Figure 20:
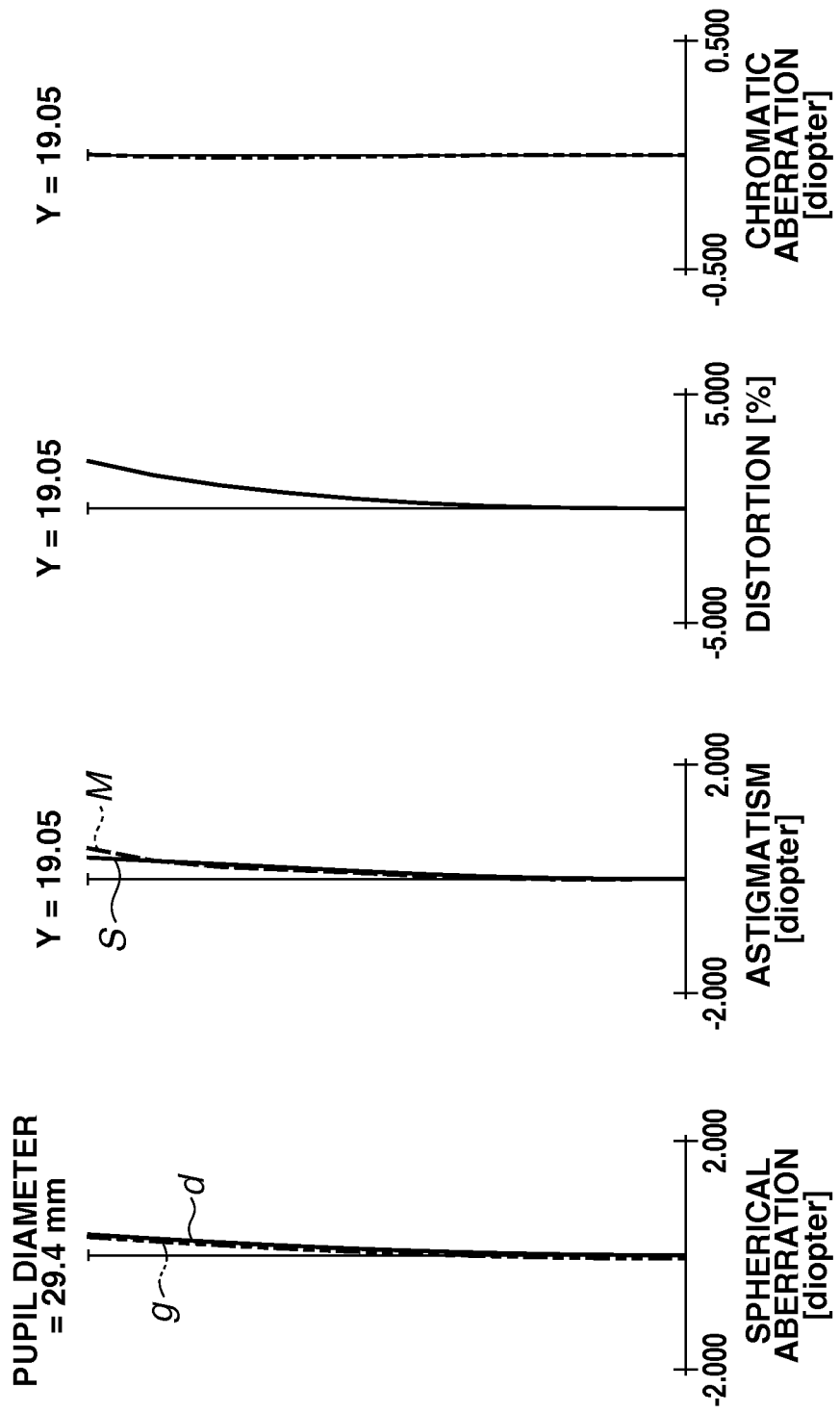
FIG. 20 illustrates aberration diagrams of the eyepiece lens according to the tenth exemplary embodiment.

FIG. 17 is a lens cross-sectional view of an eyepiece lens according to a ninth exemplary embodiment, when the diopter of the eyepiece lens is −2.0 (reference state), 2.0, and −4.0. FIG. 18 illustrates aberration diagrams of the eyepiece lens in the reference state according to the ninth exemplary embodiment. FIG. 19 is a lens cross-sectional view of an eyepiece lens according to a tenth exemplary embodiment, when the diopter of the eyepiece lens is −2.0 (reference state), 2.5, and −6.0. FIG. 20 illustrates aberration diagrams of the eyepiece lens in the reference state according to the tenth exemplary embodiment.

Figure 21:
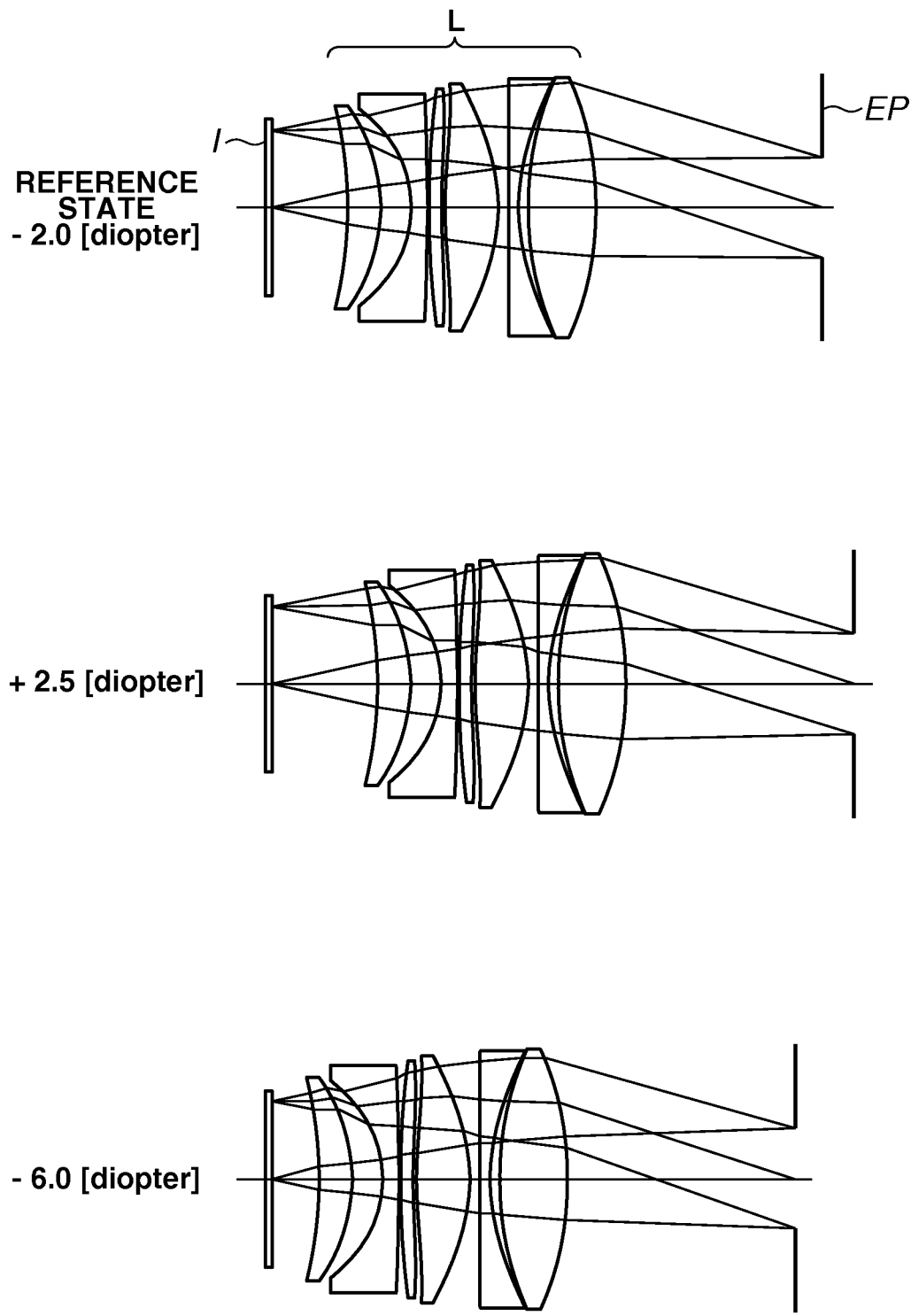
FIG. 21 is a lens cross-sectional view of an eyepiece lens according to an eleventh exemplary embodiment.
Figure 22:
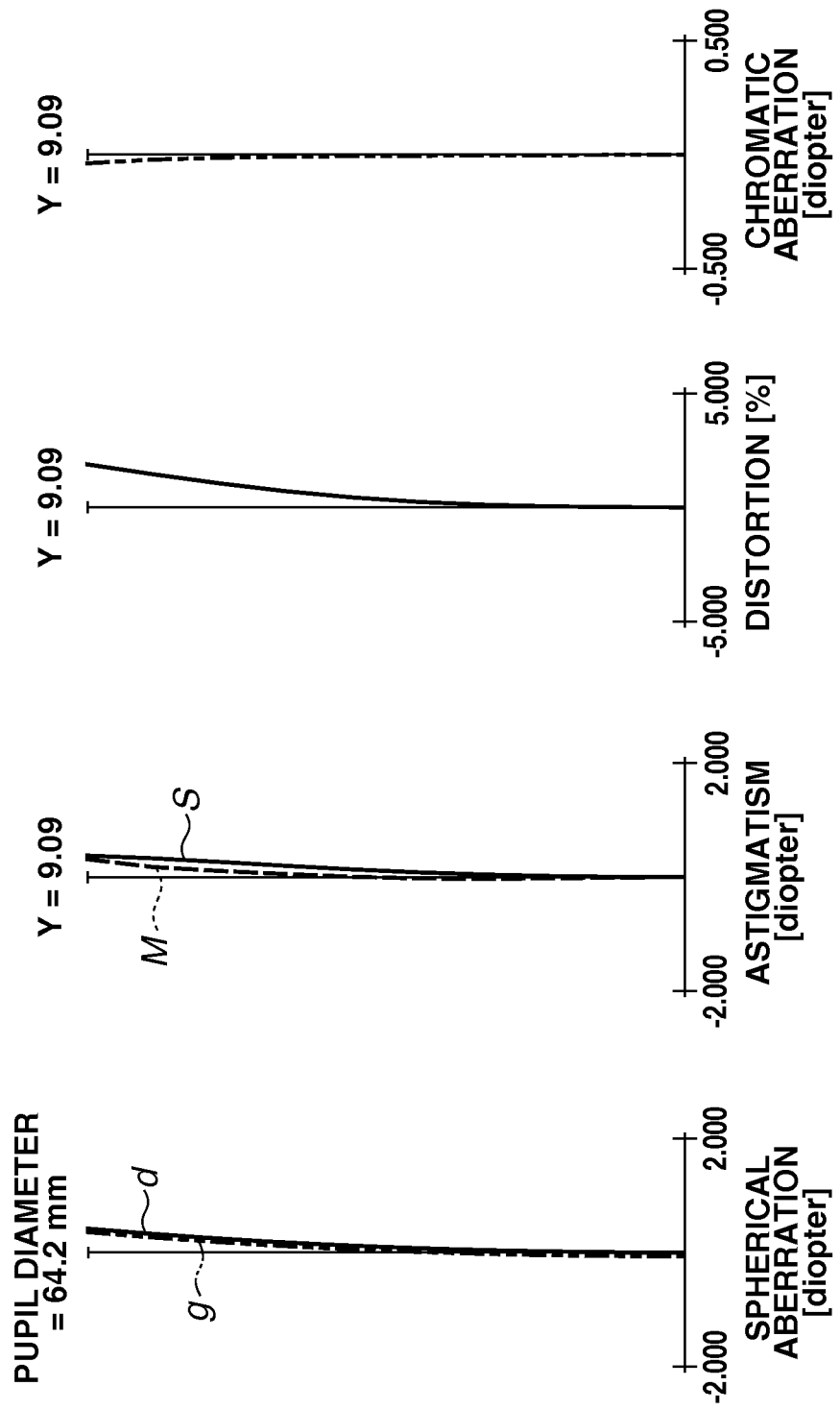
FIG. 22 illustrates aberration diagrams of the eyepiece lens according to the eleventh exemplary embodiment.
Figure 23:
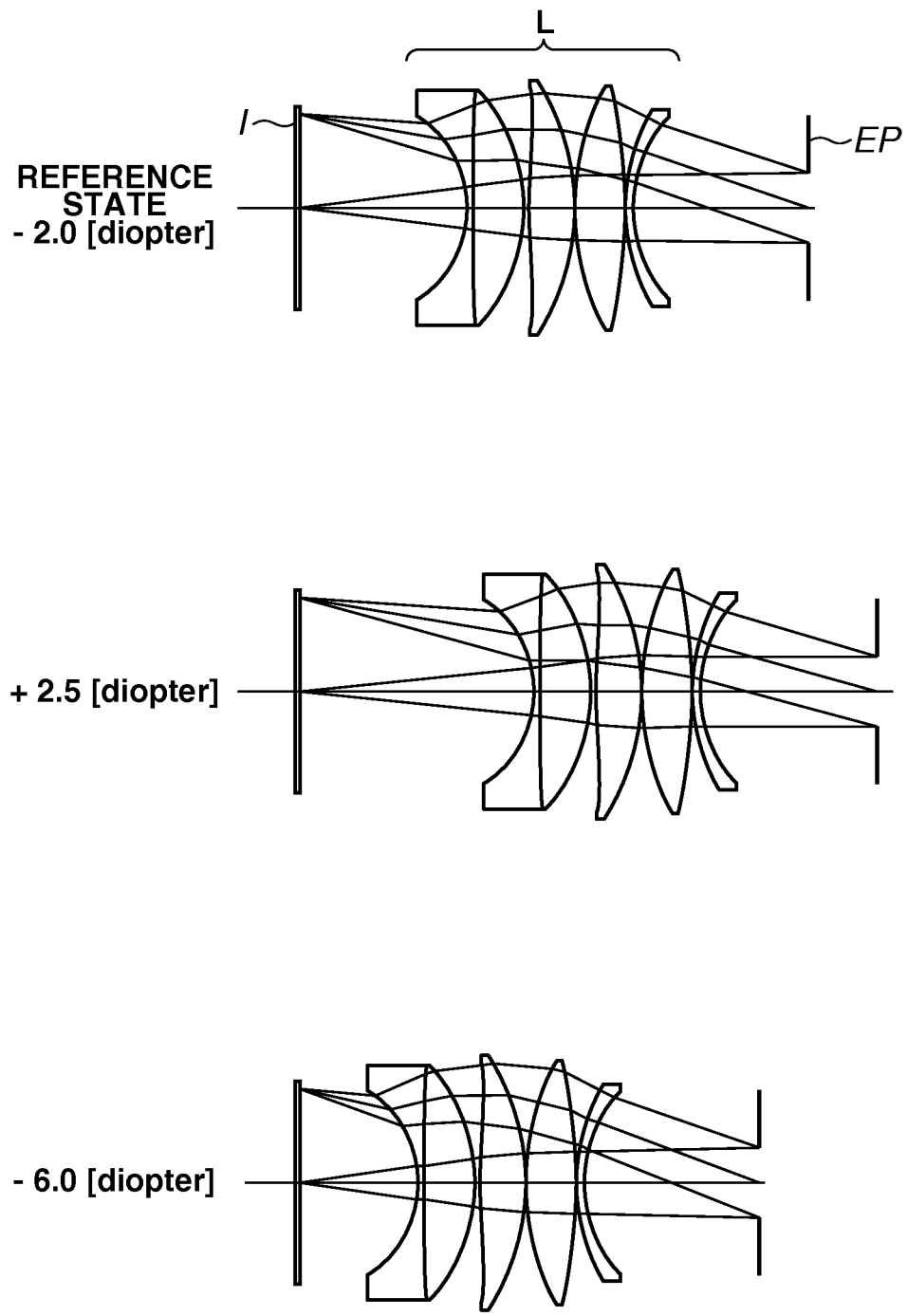
FIG. 23 is a lens cross-sectional view of an eyepiece lens according to a twelfth exemplary embodiment.
Figure 24:
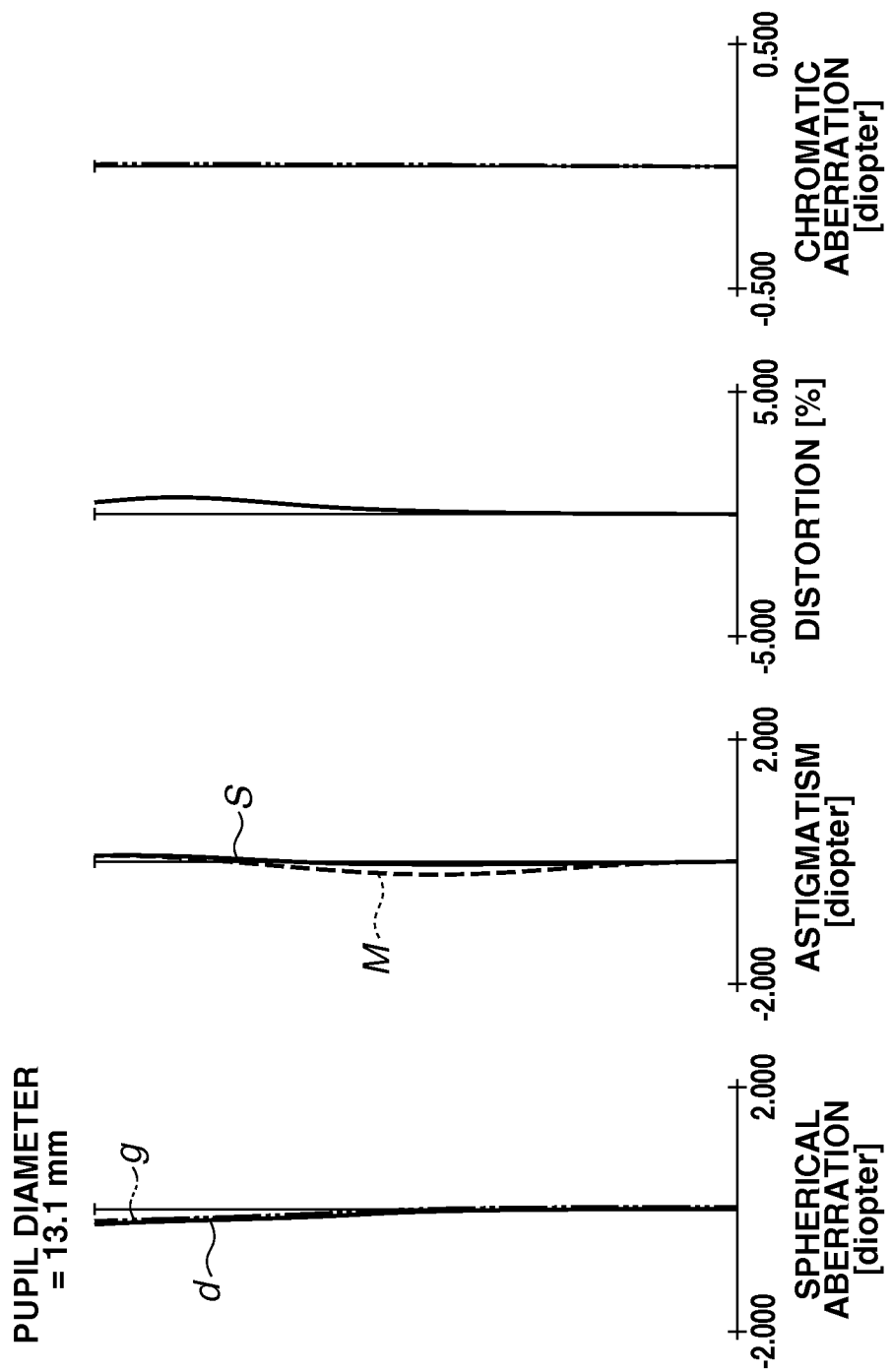
FIG. 24 illustrates aberration diagrams of the eyepiece lens according to the twelfth exemplary embodiment.

FIG. 21 is a lens cross-sectional view of an eyepiece lens according to an eleventh exemplary embodiment, when the diopter of the eyepiece lens is −2.0 (reference state), 2.5, and −6.0. FIG. 22 illustrates aberration diagrams of the eyepiece lens in the reference state according to the eleventh exemplary embodiment. FIG. 23 is a lens cross-sectional view of an eyepiece lens according to a twelfth exemplary embodiment, when the diopter of the eyepiece lens is −2.0 (reference state), 2.5, and −6.0. FIG. 24 illustrates aberration diagrams of the eyepiece lens in the reference state according to the twelfth exemplary embodiment.

Figure 25:
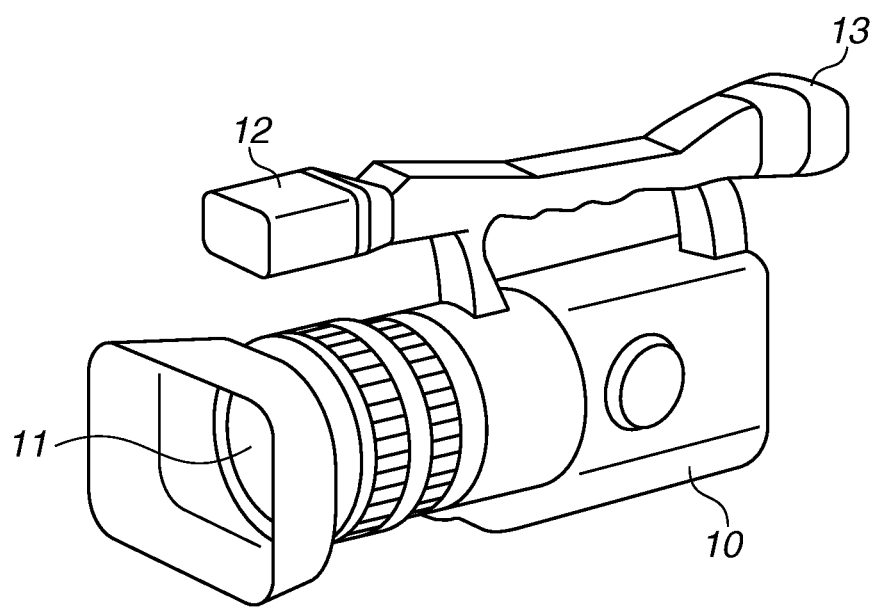
FIG. 25 is a schematic view of a main part of an imaging apparatus according to an exemplary embodiment.
Figure 26A:
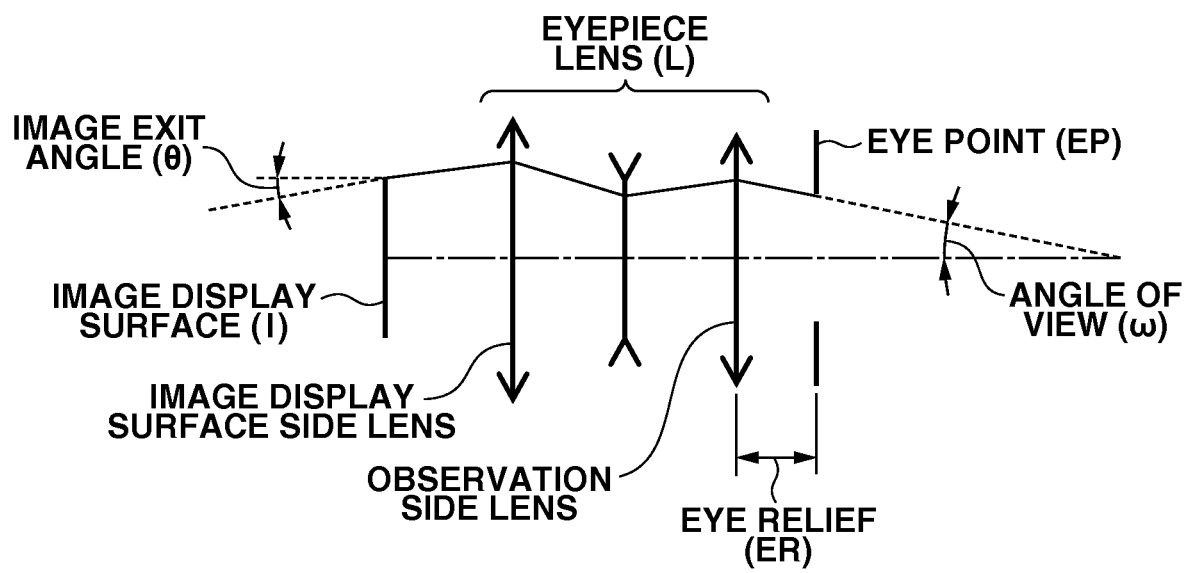
FIGS. 26A and 26B are diagrams each illustrating a relationship between a refractive power arrangement and an optical path of an optical system.
Figure 26B:
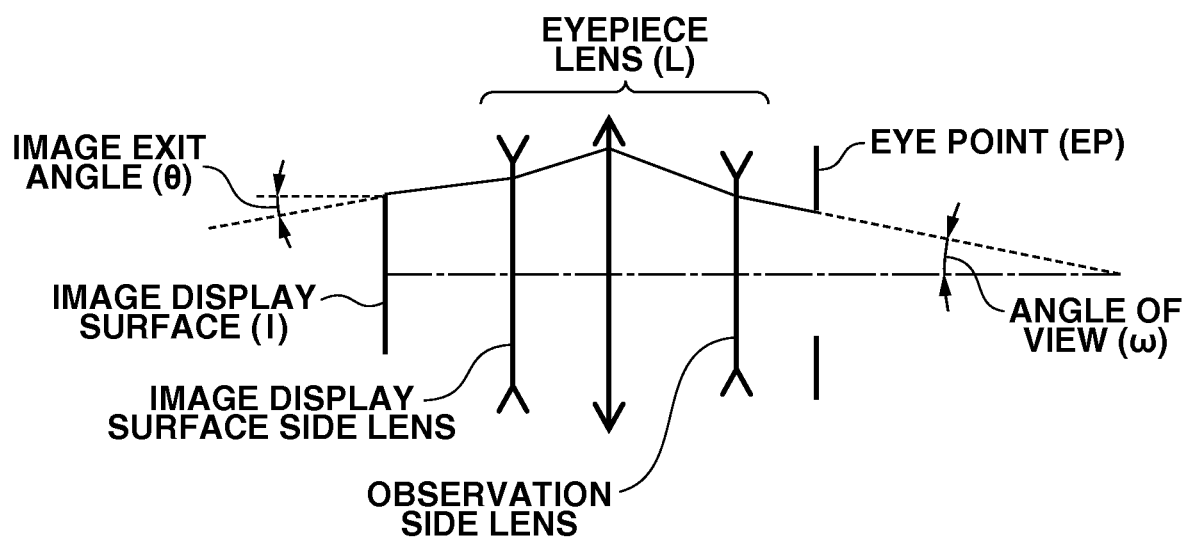
Figure 27A:
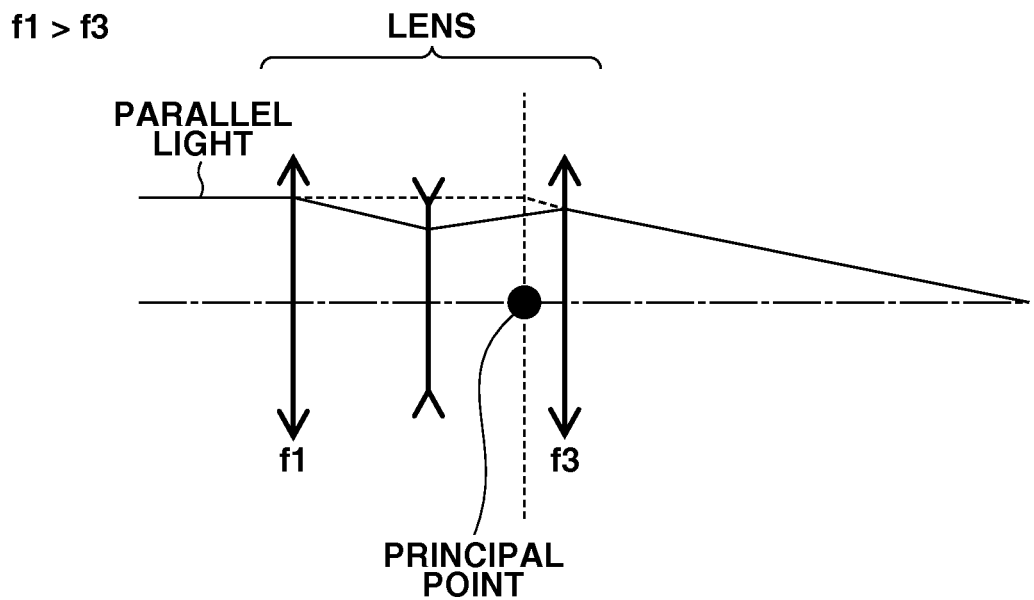
FIGS. 27A and 27B are diagrams each illustrating a relationship between a principal point position and an optical path.
Figure 27B:
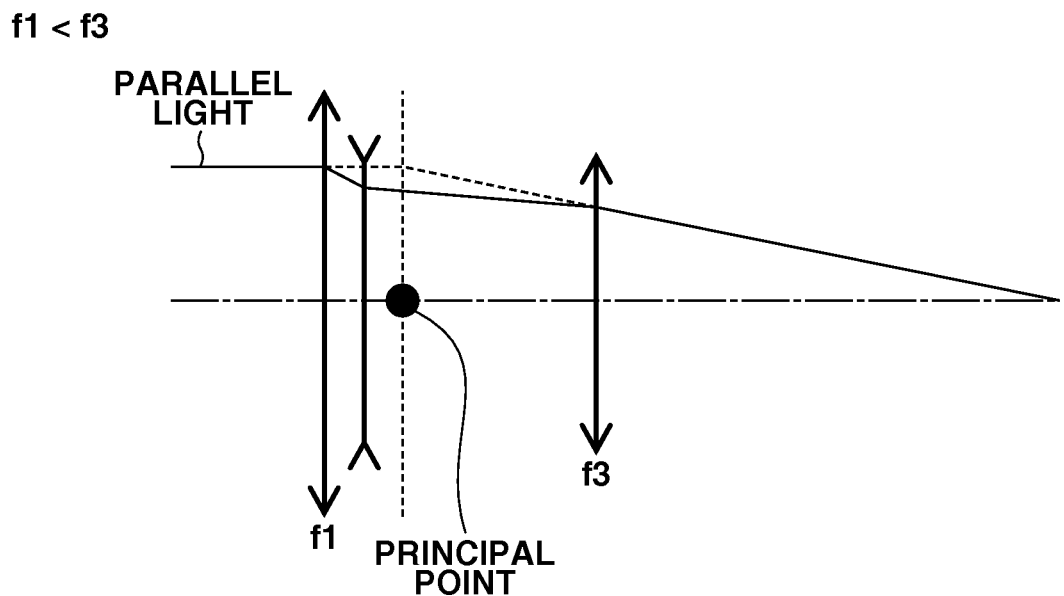
Figure 28:
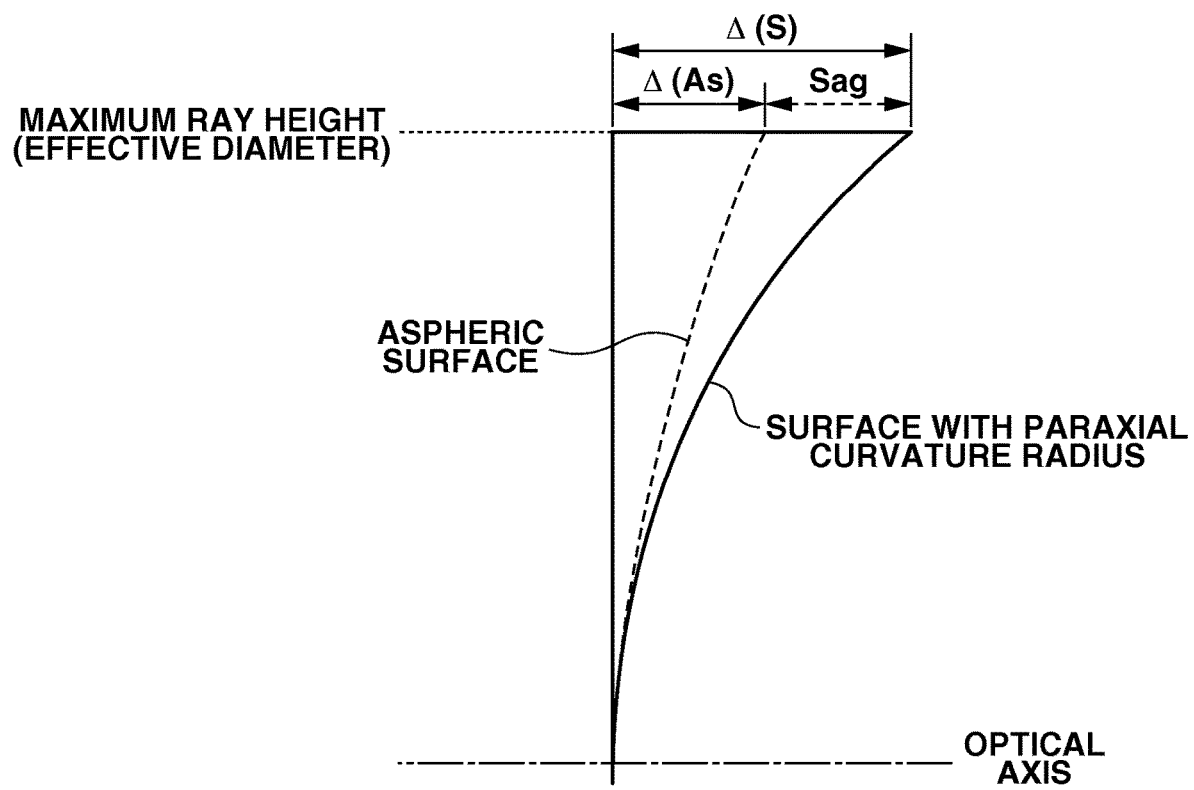
FIG. 28 is a conceptual diagram of a sagittal amount.

FIG. 25 is a schematic diagram of a main part of an imaging apparatus including the eyepiece lens according to an exemplary embodiment of the present disclosure. FIGS. 26A and 26B are diagrams illustrating that an optical path is changed depending on a refractive power arrangement of an optical system. FIGS. 27A and 27B are diagrams illustrating that an optical path is changed depending on a change in a principal point position of the optical system. FIG. 28 is a conceptual diagram illustrating a sagittal amount.

An eyepiece lens in each exemplary embodiment is used for an electronic viewfinder in an imaging apparatus, such as a digital camera or a video camera. In each lens cross-sectional view, a left side is specified as an image display surface side, and a right side is specified as an observation side. Each lens cross-sectional view includes an eyepiece lens L. An image display surface I of an image display device is configured of a liquid crystal element or an organic electroluminescence (EL) element. An eye point EP is for a user to observe an image displayed on the display surface.

A plate for protecting an image display surface or a lens may be provided between the image display surface I and a lens surface of a first lens at the image display surface side. Further, a plate for protecting a lens may be provided between the eyepiece lens L and the eye point EP. The eye point EP may be moved in an optical axis direction within a range in which an off-axis ray emitted from the image display surface I can pass through pupils of an observer.

Each aberration diagram illustrates an aberration generated in the eyepiece lens in each exemplary embodiment when the finder diopter is in the reference state.

Each spherical aberration diagram illustrates spheric aberration for a d line (wavelength: 587.6 nm) and a g line (wavelength: 435.8 nm). In each astigmatism diagram, astigmatism S is astigmatism on a sagittal image plane, and astigmatism M is astigmatism on a meridional image plane. In each distortion diagram, distortion for a d line is illustrated. In each lateral chromatic aberration diagram, lateral chromatic aberration for a g line is illustrated.

Next, a relationship between the refractive power arrangement of the eyepiece lens and a path of a ray passing through the eyepiece lens will be described with reference to FIGS. 26A, 26B, 27A, and 27B.

A path of a ray in an optical system in which a positive lens is arranged at the most image display surface side of an eyepiece lens and a path of a ray in an optical system in which a negative lens is arranged at the most image display surface side of an eyepiece lens will be compared with reference to FIGS. 26A and 26B. FIG. 26A illustrates a path of a ray in an optical system in which a positive lens is arranged at the most image display surface side of an eyepiece lens. FIG. 26B illustrates a path of a ray in an optical system in which a negative lens is arranged at the most image display surface side of an eyepiece lens.

As illustrated in FIGS. 26A and 26B, the effective diameter of the lens arranged at the most image display surface side (hereinafter referred to as an image display surface side lens) in the eyepiece lens depends on the size of the image display surface. In addition, the effective diameter of the lens arranged at the most observation side (hereinafter referred to as an observation side lens) in the eyepiece lens is determined based on an eye point EP, an angle of view ω, and an eye relief length ER. As described above, the effective diameters of the image display surface side lens and the observation side lens are determined according to a specification of a finder.

When an eyepiece lens is used for an electronic view finder, it is desirable that an angle of light (image exit angle) exiting from the image display surface and incident on the image display surface side lens is set as small as possible. This is because light obliquely exiting from the image display surface, such as a liquid crystal display surface, is likely to have reduced luminance.

On the other hand, the effective diameter of a lens arranged between the image display surface side lens and the observation side lens (hereinafter referred to as an intermediate lens) is changed according to a refractive power arrangement of the optical system. When a positive lens is used for the image display surface side lens and the observation side lens as illustrated in FIG. 26A, a ray exiting from the image display surface becomes a convergent ray on the image display surface side lens, whereby the effective diameter of the intermediate lens becomes smaller than the effective diameters of the image display surface side lens and the observation side lens. On the other hand, when a negative lens is used for the image display surface side lens and the observation side lens as illustrated in FIG. 26B, a ray exiting from the image display surface becomes a divergent ray, whereby the effective diameter of the intermediate lens becomes larger than the effective diameters of the image display surface side lens and the observation side lens.

As described above, it is desirable to constitute an optical system in such a manner that an image display surface side lens and an observation side lens have positive refractive power to decrease an effective diameter of an intermediate lens.

Next, the situation in which a height of an off-axis ray on a principal point position at the observation side is changed due to a change in a principal point position at the observation side in an optical system will be described with reference to FIGS. 27A and 27B. FIGS. 27A and 27B each schematically illustrate an optical system including a first lens with a positive refractive power, a second lens with a negative refractive power, and a third lens with a positive refractive power in order from the image display surface side to the observation side. FIG. 27A illustrates an optical path when a parallel light is incident in the optical system in which the refractive power of the third lens is set higher than the refractive power of the first lens. FIG. 27B illustrates an optical path when a parallel light is incident in the optical system in which the refractive power of the third lens is set lower than the refractive power of the first lens. FIGS. 27A and 27B are the same in an eye relief and an angle of view.

The comparison between FIGS. 27A and 27B reveals that the principal point position at the observation side in the optical system is shifted to the image display surface side by setting the refractive power of the third lens to be lower than the refractive power of the first lens, so that the height of the ray at the principal point position at the observation side increases.

As described above, with the increase in the refractive power of the positive lens arranged at the observation side, the principal point position at the observation side in the optical system can be shifted to the observation side. Thus, the height of a ray at the principal point position at the observation side can be decreased, resulting in that the effective diameter of the lens arranged near the principal point position at the observation side can be decreased.

The eyepiece lens according to each of the first to fourth exemplary embodiments comprises a first lens with a positive refractive power, a second lens with a negative refractive power, a third lens with a positive refractive power, a fourth lens with a negative refractive power, and a fifth lens with a positive refractive power in order from an object side (image display surface side) to an observation side (eye point side).

In the eyepiece lens according to each of the first to fourth exemplary embodiments, three positive lenses are arranged in such a manner that the refractive power of each lens sequentially becomes higher from the image display surface side to the observation side. With this configuration, the principal point position at the observation side in the eyepiece lens can be shifted to the observation side, whereby the effective diameter of the lens arranged near the principal point position at the observation side can be decreased. In addition, use of three positive lenses can gently refract an off-axis ray, thereby being capable of suppressing a generation of coma and high-order aberration.

The eyepiece lens according to each of the first to fourth exemplary embodiments includes three positive lenses and two negative lenses. With this configuration, a high definition observation image with axial chromatic aberration and lateral chromatic aberration being satisfactorily corrected can be obtained.

In the eyepiece lens L according to each of the first to fourth exemplary embodiments, the diopter can be adjusted by moving all the lenses, i.e., the first lens to the fifth lens, integrally in the optical axis direction. Variations of coma due to a change of the diopter can be suppressed by moving each lens integrally.

It is more desirable that, in the eyepiece lens according to each of the first to fourth exemplary embodiments, one or more of the following conditional expressions are satisfied.

Assume that the focal length of the first lens is defined as f1, the focal length of the third lens is defined as f3, the focal length of the fifth lens is defined as f5, and the focal length of the entire zoom lens of the eyepiece lens is defined as f. Further, assume that the Abbe number of the material of the second lens with respect to the d line is defined as vd2, and the Abbe number of the material of the fourth lens with respect to the d line is defined as vd4. In this case, one or more of the following conditional expressions are desirably satisfied:

$$1.00 < f1/f3 < 3.15 \quad (1)$$

$$1.00 < f3/f5 < 3.33 \quad (2)$$

$$0.53 < f5/f < 0.95 \quad (3)$$

$$5.0 < vd2 < 29.2 \quad (4)$$

$$5.0 < vd4 < 29.2 \quad (5)$$

The Abbe number vd is a numerical value represented by $$vd = (Nd-1)/(NF-NC)$$

where the refractive indices of the material with respect to the F line (486.1 nm), the C line (656.3 nm), and the d line (587.6 nm) are defined respectively as NF, NC, and Nd.

The conditional expression (1) defines a ratio between the focal length f1 of the first lens and the focal length f3 of the third lens. If the ratio exceeds the upper limit value in the conditional expression (1), the positive refractive power of the third lens becomes too high, which results in generating more coma and high-order aberration in the third lens. Thus, it is undesirable.

If the ratio becomes smaller than the lower limit value in the conditional expression (1), the refractive power of the first lens becomes higher than the refractive power of the third lens, so that the principal point position at the observation side of the eyepiece lens is shifted to the image display surface side. This increases the effective diameter of the lens arranged near the principal point position at the observation side. Thus, it is undesirable.

The conditional expression (2) defines a ratio between the focal length f3 of the third lens and the focal length f5 of the fifth lens. If the ratio exceeds the upper limit value in the conditional expression (2), the positive refractive power of the fifth lens becomes too high, which results in generating more coma and high-order aberration in the fifth lens. Thus, it is undesirable.

If the ratio becomes smaller than the lower limit value in the conditional expression (2), the refractive power of the third lens becomes higher than the refractive power of the fifth lens, so that the principal point position at the observation side of the eyepiece lens is shifted to the image display surface side. This increases the effective diameter of the lens arranged near the principal point position at the observation side. Thus, it is undesirable.

The conditional expression (3) defines a ratio between the focal length f5 of the fifth lens and the focal length f of the entire zoom lens of the eyepiece lens. If the ratio exceeds the upper limit value in the conditional expression (3), the positive refractive power of the fifth lens becomes too low, so that the principal point position at the observation side of the eyepiece lens is shifted to the image display surface side. This increases the effective diameter of the lens arranged near the principal point position at the observation side. Thus, it is undesirable.

If the ratio becomes smaller than the lower limit value in the conditional expression (3), the positive refractive power of the fifth lens becomes too high, which results in generating more coma and high-order aberration in the fifth lens. Thus, it is undesirable.

The conditional expression (4) defines the Abbe number vd2 of the material of the second lens with respect to the d line. In the eyepiece lens having a positive refractive power as a whole, negative lenses made of a highly dispersive material are arranged to satisfactorily correct chromatic aberration.

If the Abbe number vd2 becomes smaller than the lower limit value in the conditional expression (4), the chromatic aberration is undesirably corrected too much. In addition, a resin material that can be selected as a lens material is limited. Thus, it is undesirable. If the Abbe number vd2 exceeds the upper limit value in the conditional expression (4), chromatic aberration is difficult to be sufficiently corrected in the eyepiece lens. Thus, it is undesirable.

The conditional expression (5) defines the Abbe number vd4 of the material of the fourth lens with respect to the d line. In the eyepiece lens having a positive refractive power as a whole, negative lenses made of a highly dispersive material are arranged to satisfactorily correct chromatic aberration.

If the Abbe number vd4 becomes smaller than the lower limit value in the conditional expression (5), the chromatic aberration is undesirably corrected too much. In addition, a resin material that can be selected as a lens material is limited. Thus, it is undesirable. If the Abbe number vd4 exceeds the upper limit value in the conditional expression (5), chromatic aberration is difficult to be sufficiently corrected in the eyepiece lens. Thus, it is undesirable.

In the eyepiece lens according to each of the first to fourth exemplary embodiments, the numerical ranges in the conditional expressions (1) to (5) are desirably set as below.

$$1.02 < f1/f3 < 3.01 \quad (1a)$$

$$1.02 < f3/f5 < 3.18 \quad (2a)$$

$$0.61 < f5/f < 0.90 \quad (3a)$$

$$10.0 < vd2 < 27.8 \quad (4a)$$

$$10.0 < vd4 < 27.8 \quad (5a)$$

More desirably, the numerical ranges in the conditional expressions (1) to (5) are set as below.

$$1.05 < f1/f3 < 2.95 \quad (1b)$$

$$1.10 < f3/f5 < 3.10 \quad (2b)$$

$$0.63 < f5/f < 0.88 \tag{3b}$$

$$15.0 < vd2 < 27.0 \tag{4b}$$

$$15.0 < vd4 < 27.0 \tag{5b}$$

When the eyepiece lens L according to each exemplary embodiment is used for an observation apparatus for observing image information displayed onto the image display surface I, the following conditional expression is desirably satisfied:

$$0.52 < H/f < 0.91 \tag{6}$$

where H is the diagonal length of the image display surface I.

The conditional expression (6) defines a ratio between the diagonal length H of the image display surface I and the focal length f of the eyepiece lens.

When the ratio becomes smaller than the lower limit value in the conditional expression (6), and the focal length f of the eyepiece lens becomes too long, the angle of view becomes too narrow. Thus, it is undesirable.

When the ratio exceeds the upper limit value in the conditional expression (6), and the focal length f of the eyepiece lens becomes too short, the effective diameter of the lens arranged at the observation side becomes too large. Consequently, off-axis aberration such as coma or astigmatism is greatly generated. Thus, it is undesirable.

In the first to fourth exemplary embodiments, desirably, the numerical range in the conditional expression (6) is set as below.

$$0.56 < H/f < 0.87 \tag{6a}$$

More desirably, the numerical range in the conditional expression (6) is set as described below.

$$0.60 < H/f < 0.85 \tag{6b}$$

The eyepiece lens according to each of the first to eighth exemplary embodiments comprises a first lens with a positive refractive power, a second lens with a negative refractive power, a third lens with a positive refractive power, and a fourth lens with a negative refractive power in order from an object side (image display surface side) to an observation side (eye point side).

When an eyepiece lens with a long eye relief and wide angle of view is implemented, an observation image might be unclear. The present disclosure provides at least one embodiment of an eyepiece lens comprising at least two positive lenses and at least two negative lenses. With this configuration, a high definition observation image with axial chromatic aberration and lateral chromatic aberration being satisfactorily corrected can be obtained.

In the eyepiece lens L according to each of the first to eighth exemplary embodiments, the diopter can be adjusted by moving all the lenses integrally in the optical axis direction. Variations of coma due to a change of the diopter can be suppressed by moving all lenses integrally.

In the eyepiece lens according to each of the first to eighth exemplary embodiments, the following conditional expression is satisfied:

$$-12.00 < (R21+R32)/(R21-R32) < -3.00 \tag{7}$$

where the paraxial curvature radius on the object-side lens surface of the second lens is defined as R21, and the paraxial curvature radius on the observation-side lens surface of the third lens is defined as R32.

When the ratio exceeds the upper limit value in the conditional expression (7), either one of the paraxial curvature radius R21 on the object-side lens surface of the second lens and the paraxial curvature radius R32 of the observation-side lens surface of the third lens becomes too small, which results in difficulty in satisfactorily correcting astigmatic difference. Thus, it is undesirable.

When the ratio becomes smaller than the lower limit value in the conditional expression (7), the difference between the paraxial curvature radius R21 on the object-side lens surface of the second lens and the paraxial curvature radius R32 of the observation-side lens surface of the third lens becomes too small, which results in difficulty in satisfactorily correcting coma. Thus, it is undesirable.

In the eyepiece lens according to each of the first to eighth exemplary embodiments, the numerical range in the conditional expression (7) is desirably set as below.

$$-10.50 < (R21+R32)/(R21-R32) < -3.10 \tag{7a}$$

More desirably, the numerical range in the conditional expression (7) is set as below.

$$-9.00 < (R21+R32)/(R21-R32) < -3.20 \tag{7b}$$

It is further desirable that, in the eyepiece lens according to each of the first to eighth exemplary embodiments, one or more of the following conditional expressions are satisfied:

$$-0.95 < f2/f3 < -0.32 \tag{8}$$

$$5.0 < vd2 < 33.1 \tag{9}$$

$$5.0 < vd4 < 28.0 \tag{10}$$

The focal length of the second lens is defined as f2, the focal length of the third lens is defined as f3, the Abbe number of the material of the second lens with respect to the d line is defined as vd2, and the Abbe number of the material of the fourth lens with respect to the d line is defined as vd4.

The Abbe number vd is a numerical value represented by $$vd=(Nd-1)/(NF-NC)$$

where the refractive indices of the material with respect to the F line (486.1 nm), the C line (656.3 nm), and the d line (587.6 nm) are defined respectively as NF, NC, and Nd.

The conditional expression (8) defines a ratio between the focal length f2 of the second lens and the focal length f3 of the third lens. If the ratio exceeds the upper limit value in the conditional expression (8), and the focal length f2 of the second lens becomes too short, the refractive power of the second lens becomes too high. Consequently, it becomes difficult to correct spherical aberration. Thus, it is undesirable.

If the ratio becomes smaller than the lower limit value in the conditional expression (8), and the focal length f3 of the third lens becomes too short, the refractive power of the third lens becomes too high. Consequently, it becomes difficult to satisfactorily correct astigmatic difference. Thus, it is undesirable.

The conditional expression (9) defines the Abbe number vd2 of the material of the second lens having a negative refractive power with respect to the d line. In the eyepiece lens having a positive refractive power as a whole, negative lenses made of a highly dispersive material are arranged to satisfactorily correct chromatic aberration.

If the Abbe number vd2 exceeds the upper limit value in the conditional expression (9), it becomes difficult to sufficiently correct the chromatic aberration in the eyepiece lens. Thus, it is undesirable. If the Abbe number vd2 becomes smaller than the lower limit value in the conditional expression (9), the chromatic aberration is undesirably corrected too much. In addition, a resin material that can be selected as a lens material is limited. Thus, it is undesirable.

The conditional expression (10) defines the Abbe number vd4 of the material of the fourth lens having a negative refractive power with respect to the d line. In the eyepiece lens having a positive refractive power as a whole, negative lenses made of a highly dispersive material are arranged to satisfactorily correct chromatic aberration.

If the Abbe number vd4 exceeds the upper limit value in the conditional expression (10), it becomes difficult to sufficiently correct the chromatic aberration in the eyepiece lens. Thus, it is undesirable. If the Abbe number vd4 becomes smaller than the lower limit value in the conditional expression (10), the chromatic aberration is undesirably corrected too much. In addition, a resin material that can be selected as a lens material is limited. Thus, it is undesirable.

In the eyepiece lens according to each of the first to eighth exemplary embodiments, the numerical ranges in the conditional expressions (8) to (10) are desirably set as below.

$$-0.93 < f2/f3 < -0.34 \tag{8a}$$

$$10.0 < vd2 < 31.5 \tag{9a}$$

$$10.0 < vd4 < 25.0 \tag{10a}$$

More desirably, the numerical ranges in the conditional expressions (8) to (10) are set as below.

$$-0.90 < f2/f3 < -0.36 \tag{8b}$$

$$15.0 < vd2 < 30.3 \tag{9b}$$

$$15.0 < vd4 < 24.0 \tag{10b}$$

When the eyepiece lens L according to each of the first to eighth exemplary embodiments is used for an observation apparatus for observing image information displayed on the image display surface I, the following conditional expression is desirably satisfied:

$$0.52 < H/f < 0.91 \tag{11}$$

where the focal length of the entire zoom lens of the eyepiece lens is defined as f, and the diagonal length of the image display surface I is defined as H.

The conditional expression (11) defines a ratio between the diagonal length H of the image display surface I and the focal length f of the eyepiece lens.

When the ratio becomes smaller than the lower limit value in the conditional expression (11), and the focal length f of the eyepiece lens becomes too long, the angle of view becomes too narrow. Thus, it is undesirable.

When the ratio exceeds the upper limit value in the conditional expression (11), and the focal length f of the eyepiece lens becomes too short, the effective diameter of the lens arranged at the observation side becomes too large. Consequently, off-axis aberration such as coma or astigmatism is greatly generated. Thus, it is undesirable.

In the first to eighth exemplary embodiments, desirably, the numerical range in the conditional expression (11) is set as below.

$$0.56 < H/f < 0.87 \tag{11a}$$

More desirably, the numerical range in the conditional expression (11) is set as below.

$$0.60 < H/f < 0.85 \tag{11b}$$

The eyepiece lens according to each of the first to fourth and ninth to eleventh exemplary embodiments comprises positive lenses arranged at the most object side (image display surface side) and at the most observation side (eye point side), and one or more negative lenses. If an eyepiece lens is constituted only by a positive lens, a sufficient correction of axial chromatic aberration and lateral chromatic aberration becomes difficult. In view of this, one or more negative lenses are arranged in the eyepiece lens.

As a configuration in which a negative lens is arranged with the number of positive lenses being increased, it is considered that an eyepiece lens is configured by three lenses, i.e., two positive lenses and one negative lens. However, to implement an eyepiece lens having a long eye relief, a wide angle of view, and excellent optical performance, the number of lenses constituting the eyepiece lens has to be increased. In view of this, the eyepiece lens according to at least one embodiment of the present disclosure is configured by using five or more lenses. Preferably, the eyepiece lens includes two or more negative lenses, thereby being capable of satisfactorily correcting axial chromatic aberration and lateral chromatic aberration.

In the eyepiece lens according to each of the first to fourth and ninth to eleventh exemplary embodiments, the following conditional expression is satisfied:

$$0.58 < fe/f < 0.95 \tag{12}$$

where the focal length of the lens arranged at the most observation side out of the lenses constituting the eyepiece lens is defined as fe, and the focal length of the entire zoom lens of the eyepiece lens is defined as f.

The conditional expression (12) defines a ratio between the focal length f of the entire zoom lens of the eyepiece lens and the focal length fe of the lens arranged at the most observation side out of the lenses constituting the eyepiece lens.

If the ratio exceeds the upper limit value in the conditional expression (12), and the focal length fe of the lens arranged at the most observation side out of the lenses constituting the eyepiece lens becomes long, the refractive power of the lens arranged at the most observation side becomes too low. Consequently, the principal point position at the observation side in the optical system is shifted to the image display surface side, so that the effective diameter of the lens arranged near the principal point position at the observation side increases. Thus, it is undesirable.

If the ratio becomes smaller than the lower limit value in the conditional expression (12), and the focal length fe of the lens arranged at the most observation side out of the lenses constituting the eyepiece lens becomes short, the refractive power of the lens arranged at the most observation side becomes too high. This results in generating more coma and high-order aberration in the lens arranged at the most object side. Thus, it is undesirable.

In the eyepiece lens according to each of the first to fourth and ninth to eleventh exemplary embodiments, desirably, the numerical range in the conditional expression (12) is set as below.

$$0.59 < fe/f < 0.92 \tag{12a}$$

More desirably, the numerical range in the conditional expression (12) is set as below.

$$0.61 < fe/f < 0.90 \tag{12b}$$

It is further desirable that, in the eyepiece lens according to each of the first to fourth and ninth to eleventh exemplary embodiments, one or more of the following conditional expressions are satisfied:

$$1.17 < ff/fe < 4.71 \tag{13}$$

$$5.0 < vdn < 29.2 \tag{14}$$

$$-3.30 < Rf2/Re1 < -0.48 \tag{15}$$

The focal length of the lens arranged at the most object side out of the lenses constituting the eyepiece lens is defined as ff, and the Abbe number of the material of the negative lens constituting the eyepiece lens with respect to the d line is defined as νdn. The paraxial curvature radius on the observation-side lens surface of the lens arranged at the most object side out of the lenses constituting the eyepiece lens is defined as Rf2. The paraxial curvature radius on the object-side lens surface of the lens arranged at the most observation side out of the lenses constituting the eyepiece lens is defined as Re1.

In the conditional expression (14), the Abbe number νdn is a numerical value represented by $$\nu dn=(Nd-1)/(NF-NC)$$

where the refractive indices of the material with respect to the F line (486.1 nm), the C line (656.3 nm), and the d line (587.6 nm) are defined respectively as NF, NC, and Nd.

The conditional expression (13) defines a ratio between the focal length fe of the lens arranged at the most observation side and the focal length ff of the lens arranged at the most object side. If the ratio exceeds the upper limit value in the conditional expression (13), and the focal length fe of the lens arranged at the most observation side becomes too short, the refractive power of the lens arranged at the most observation side becomes too high. Consequently, it becomes difficult to sufficiently correct spherical aberration. Thus, it is undesirable.

If the ratio becomes smaller than the lower limit value in the conditional expression (13), and the focal length ff of the lens arranged at the most object side becomes too short, the refractive power of the lens arranged at the most object side becomes too high. Consequently, it becomes difficult to sufficiently correct astigmatic difference. Thus, it is undesirable.

The conditional expression (14) defines the Abbe number νdn of the material of the negative lens constituting the eyepiece lens with respect to the d line. In the eyepiece lens having a positive refractive power as a whole, negative lenses made of a highly dispersive material are arranged to satisfactorily correct chromatic aberration.

If the Abbe number νdn exceeds the upper limit value in the conditional expression (14), it becomes difficult to sufficiently correct the chromatic aberration in the eyepiece lens. Thus, it is undesirable. If the Abbe number νdn becomes smaller than the lower limit value in the conditional expression (14), the chromatic aberration is undesirably corrected too much. In addition, a resin material that can be selected as a lens material is limited. Thus, it is undesirable.

The conditional expression (15) defines a ratio between the curvature radius Rf2 on the observation-side lens surface of the lens arranged at the most object side and the curvature radius Re1 on the object-side lens surface of the lens arranged at the most observation side. If the ratio exceeds the upper limit value in the conditional expression (15), and the absolute value of the curvature radius Rf2 becomes small, the refractive power of the observation-side lens surface of the lens arranged at the most object side becomes too high. Therefore, it becomes difficult to reduce astigmatism difference and spherical aberration. Thus, it is undesirable.

If the ratio becomes smaller than the lower limit value in the conditional expression (15), and the absolute value of the curvature radius Re1 becomes small, the refractive power of the object-side lens surface of the lens arranged at the most observation side becomes too high. Therefore, it becomes difficult to reduce variations of coma due to a change of the diopter. Thus, it is undesirable.

Desirably, in the eyepiece lens according to each of the first to fourth and ninth to eleventh exemplary embodiments, the numerical ranges in the conditional expressions (13) to (15) are set as described below.

$$1.20<ff/fe<4.50 \quad (13a)$$

$$10.0<\nu dn<28.0 \quad (14a)$$

$$-3.15<Rf2/Re1<-0.50 \quad (15a)$$

More desirably, the numerical ranges in the conditional expressions (13) to (15) are set as below.

$$1.25<ff/fe<4.30 \quad (13b)$$

$$15.0<\nu dn<26.8 \quad (14b)$$

$$-3.10<Rf2/Re1<-0.52 \quad (15b)$$

When the eyepiece lens L according to each exemplary embodiment is used for an observation apparatus for observing image information displayed on the image display surface I, the following conditional expression is desirably satisfied:

$$0.52<H/f<0.91 \quad (16)$$

where the diagonal length of the image display surface I is defined as H.

The conditional expression (16) defines a ratio between the diagonal length H of the image display surface I and the focal length f of the eyepiece lens.

When the ratio becomes smaller than the lower limit value in the conditional expression (16), and the focal length f of the eyepiece lens becomes too long, the angle of view becomes too narrow. Thus, it is undesirable.

When the ratio exceeds the upper limit value in the conditional expression (16), and the focal length f of the eyepiece lens becomes too short, off-axis aberration such as coma or astigmatism is greatly generated. Thus, it is undesirable.

In the first to fourth and ninth to eleventh exemplary embodiments, desirably, the numerical range in the conditional expression (16) is set as below.

$$0.56<H/f<0.87 \quad (16a)$$

More desirably, the numerical range in the conditional expression (16) is set as below.

$$0.60<H/f<0.85 \quad (16b)$$

In the eyepiece lens L according to each of the first to fourth and ninth to eleventh exemplary embodiments, the diopter can be adjusted by moving all the lenses integrally in the optical axis direction. Variations of coma due to a change of the diopter can be suppressed by moving all lenses integrally.

The eyepiece lens according to each of the first, fourth to seventh, ninth, tenth, and twelfth exemplary embodiments includes three or more lenses, each having a lens surface with an aspheric shape rotationally symmetrical about an optical axis (hereinafter referred to as aspheric lenses), and includes five or more lenses as a whole eyepiece lens.

To implement an eyepiece lens having a long distance (eye relief) from the lens surface at the most observation side of the eyepiece lens to an eye point, and a wide angle of view, the lens diameter of the eyepiece lens is generally increased, whereby an off-axis ray passes through the position far apart from the optical axis. This entails a problem such that off-axis aberration such as coma, curvature of field, or distortion is greatly generated.

In the eyepiece lens according to each of the first, fourth to seventh, ninth, tenth, and twelfth exemplary embodiments, three or more aspheric lenses are used to satisfactorily correct off-axis aberration such as coma, curvature of field, and distortion.

When an eyepiece lens with a long eye relief and wide angle of view is implemented, an observation image might be unclear. The eyepiece lens according to each of the first, fourth to seventh, ninth, tenth, and twelfth exemplary embodiments includes two or more positive lenses, and two or more negative lenses. With this configuration, a high definition observation image with an axial chromatic aberration and a lateral chromatic aberration being satisfactorily corrected can be obtained.

In the eyepiece lens L according to each of the first, fourth to seventh, ninth, tenth, and twelfth exemplary embodiments, the diopter can be adjusted by moving all the lenses integrally in the optical axis direction. Variations of coma due to a change of the diopter can be suppressed by moving all lenses integrally.

In addition, in the eyepiece lens L according to each of the first, fourth to seventh, ninth, tenth, and twelfth exemplary embodiments, one or more of the following conditional expressions are desirably satisfied:

$$0.007 < |Sagmax/RS| < 0.200 \quad (17)$$

$$0.003 < |Sagmax/fS| < 0.150 \quad (18)$$

$$0.23 < ER/f < 1.05 \quad (19)$$

$$5.0 < vdn < 34.0 \quad (20)$$

In these conditional expressions, the difference between the sagittal amount of the surface with a paraxial curvature radius and the sagittal amount of the lens surface with an aspheric shape at the maximum height where an off-axis ray passes on or through the lens surface with an aspheric shape is defined as Sag. The paraxial curvature radius of the lens surface with an aspheric shape by which the absolute value |Sag| of the difference between the sagittal amounts becomes maximum is defined as RS. The maximum value of the absolute value |Sag| of the difference between the sagittal amounts is defined as Sagmax.

The difference Sag between the sagittal amounts will be described with reference to FIG. 28. The sagittal amount indicates a distance between a vertical line from a vertex of the lens surface to the optical axis and the lens surface based on the maximum height (the distance from the optical axis) where the off-axis ray passes through the lens surface having an aspheric shape rotationally symmetrical about the optical axis. When the sagittal amount of the surface with a paraxial curvature radius is defined as $\Delta(S)$, and the sagittal amount of the lens surface having an aspheric shape is defined as $\Delta(As)$, the difference Sag between the sagittal amounts is represented as $$Sag = \Delta(S) - \Delta(As)$$

The focal length of the lens with the lens surface having an aspheric shape by which the absolute value |Sag| of the difference between the sagittal amounts becomes the maximum is defined as fS, the distance (eye relief) from the lens surface at the most observation side of the eyepiece lens to the eye point is defined as ER, and the focal length of the entire zoom lens of the eyepiece lens is defined as f. In addition, the Abbe number of the material of the negative lens constituting the eyepiece lens with respect to the d line is defined as vdn.

The Abbe number vdn is a numerical value represented by $$vdn = (Nd-1)/(NF-NC)$$

where the refractive indices of the material with respect to the F line (486.1 nm), the C line (656.3 nm), and the d line (587.6 nm) are defined respectively as NF, NC, and Nd.

If the ratio exceeds the upper limit value in the conditional expression (17), and the maximum value Sagmax of the absolute value |Sag| of the difference between the sagittal amounts with respect to the paraxial curvature radius RS becomes large, off-axis aberration is corrected too much. Thus, it is undesirable. Further, the formation of the lens surface with an aspheric shape becomes difficult. Thus, it is undesirable.

If the ratio becomes smaller than the lower limit value in the conditional expression (17), and the maximum value Sagmax of the absolute value |Sag| of the difference between the sagittal amounts with respect to the paraxial curvature radius RS becomes small, off-axis aberration is difficult to be sufficiently corrected. Thus, it is undesirable.

An eyepiece lens having a long eye relief, a wide angle of view, and high optical performance can be obtained by appropriately setting the shape of the aspheric lens in order that the conditional expression (17) is satisfied.

If the ratio exceeds the upper limit value in the conditional expression (18), the maximum value Sagmax of the absolute value |Sag| of the difference between the sagittal amounts with respect to the focal length fS of the lens with a lens surface of an aspheric shape by which the absolute value |Sag| of the difference between the sagittal amounts becomes maximum becomes too large. As a result, off-axis aberration is corrected too much. Thus, it is undesirable. In addition, the refractive power of the lens with a lens surface of an aspheric shape by which the absolute value |Sag| of the difference between the sagittal amounts becomes maximum becomes too high. Therefore, more spherical aberration and coma occurs. Thus, it is undesirable.

If the ratio becomes smaller than the lower limit value in the conditional expression (18), the maximum value Sagmax of the absolute value |Sag| of the difference between the sagittal amounts with respect to the focal length fS of the lens with a lens surface of an aspheric shape by which the absolute value |Sag| of the difference between the sagittal amounts becomes maximum becomes too small. As a result, off-axis aberration is difficult to be sufficiently corrected. Thus, it is undesirable.

The conditional expression (19) defines a ratio between the focal length f of the entire zoom lens of the eyepiece lens and the eye relief ER. When the ratio exceeds an upper limit value in the conditional expression (19), and the eye relief ER becomes long, the effective diameter of the lens arranged at the most observation side increases, so that the off-axis aberration is difficult to be sufficiently corrected. Thus, it is undesirable.

If the ratio becomes smaller than the lower limit value in the conditional expression (19), and the eye relief ER becomes short, the angle of view becomes too narrow. Thus, it is undesirable.

The conditional expression (20) defines the Abbe number vdn of the material of the negative lens constituting the eyepiece lens with respect to the d line. In the eyepiece lens having a positive refractive power as a whole, negative lenses made of a highly dispersive material are arranged to satisfactorily correct chromatic aberration.

If the Abbe number vdn exceeds the upper limit value in the conditional expression (20), it becomes difficult to sufficiently correct the chromatic aberration in the eyepiece lens. Thus, it is undesirable. If the Abbe number vdn becomes smaller than the lower limit value in the conditional expression (20), the chromatic aberration is undesirably corrected too much. In addition, a resin material that can be selected as a lens material is limited. Thus, it is undesirable.

Desirably, in the eyepiece lens according to each of the first, fourth to seventh, ninth, tenth, and twelfth exemplary embodiments, the numerical ranges in the conditional expressions (17) to (20) are set as below.

$$0.015 < |Sagmax/RS| < 0.120 \quad (17a)$$

$$0.010 < |Sagmax/fS| < 0.075 \quad (18a)$$

$$0.24 < ER/f < 1.00 \quad (19a)$$

$$10.0 < vdn < 30.2 \quad (20a)$$

More desirably, the numerical ranges in the conditional expressions (17) to (20) are set as below.

$$0.024 < |Sagmax/RS| < 0.075 \quad (17b)$$

$$0.018 < |Sagmax/fS| < 0.040 \quad (18b)$$

$$0.25 < ER/f < 0.98 \quad (19b)$$

$$15.0 < vdn < 24.0 \quad (20b)$$

When the eyepiece lens L according to each exemplary embodiment is used for an observation apparatus for observing image information displayed on the image display surface I, the following conditional expression is desirably satisfied:

$$0.52 < H/f < 0.91 \quad (21)$$

where the diagonal length of the image display surface I is defined as H.

The conditional expression (21) defines a ratio between the diagonal length H of the image display surface I and the focal length f of the eyepiece lens.

When the ratio becomes smaller than the lower limit value in the conditional expression (21), and the focal length f of the eyepiece lens becomes too long, the angle of view becomes too narrow. Thus, it is undesirable.

When the ratio exceeds the upper limit value in the conditional expression (21), and the focal length f of the eyepiece lens becomes too short, the effective diameter of the lens arranged at the observation side becomes too large. As a result, off-axis aberration such as coma or astigmatism is greatly generated on the lens arranged at the observation side. Thus, it is undesirable.

Desirably, in each of the first, fourth to seventh, ninth, tenth, and twelfth exemplary embodiments, the numerical range in the conditional expression (21) is set as below.

$$0.56 < H/f < 0.87 \quad (21a)$$

More desirably, the numerical range in the conditional expression (21) is set as below.

$$0.60 < H/f < 0.85 \quad (21b)$$

Next, first to twelfth numerical embodiments respectively corresponding to the first to twelfth exemplary embodiments of the present disclosure will be described. In each numerical embodiment, i represents an order of an optical surface from the image display surface side. ri represents the paraxial curvature radius of the i-th optical surface (i-th surface), and di represents the interval between the i-th surface and the (i+1)-th surface. Further, ndi and vdi each represent the refractive index and the Abbe number of the material of the ith optical member with respect to the d line. r1 represents the image display surface, and r2 represents the surface of the plate protecting the image display surface. The surface at the most observation side indicates the eye point EP.

The aspheric shape is represented by $$x = (h^2/R)/[1+[1-(1+K)(h/R)^2]^{1/2}] + A4h^4 + A6h^6 + A8h^8$$

where K is eccentricity, A4, A6, and A8 are aspheric coefficients, and a displacement in the optical axis direction at the position of the height h from the optical axis is defined as x with the surface vertex being defined as a reference. In addition, R is a paraxial curvature radius. The surface with * at the right of a surface number means that this surface is aspheric. "e-Z" indicates "$10^{-Z}$".

Numerical Embodiment 1 (EX. 1)

| Unit mm | | | | |
|---|---|---|---|---|
| Surface Data | | | | |
| Surface Number | r | d | nd | vd |
| 1 | ∞ | 0.70 | 1.51000 | 60.0 |
| 2 | ∞ | (Variable) | | |
| 3 | −65.737 | 3.95 | 2.00069 | 25.5 |
| 4 | −22.170 | 3.52 | | |
| 5* | −14.334 | 3.00 | 1.63550 | 23.8 |
| 6* | 110.330 | 0.30 | | |
| 7* | 48.492 | 6.84 | 1.53110 | 55.9 |
| 8* | −21.874 | 1.20 | | |
| 9* | 128.789 | 1.41 | 1.63550 | 23.8 |
| 10* | 22.276 | 1.20 | | |
| 11 | 39.057 | 8.21 | 1.83481 | 42.7 |
| 12 | −39.057 | 27.00 | | |
| 13 (Eye Point) | | | | |

| Aspheric Surface Data |
|---|
| 5th Surface |

K = −7.28787e−001    A4 = −6.03675e−005    A6 = 1.77471e−007

6th Surface

K = 4.51650e+001    A4 = −1.11796e−005    A6 = −6.19143e−008

7th Surface

K = −4.38548e+000    A4 = −2.38798e−005    A6 = −2.65742e−008

8th Surface

K = −1.22703e+000    A4 = −4.69821e−006    A6 = 3.91413e−008

9th Surface

K = −2.69921e+002    A4 = −1.52881e−007    A6 = −4.63945e−009

10th Surface

K = −4.63925e+000    A4 = 4.39848e−006    A6 = 5.19693e−010

| Various Data | | | |
|---|---|---|---|
| Diopter [diopter] | −2.0 | +2.5 | −6.0 |
| Focal Length | 28.56 | 28.56 | 28.56 |
| d2 | 9.12 | 12.79 | 5.80 |

Numerical Embodiment 2 (EX. 2)

Unit mm

Surface Data

| Surface Number | r | d | nd | vd |
|---|---|---|---|---|
| 1 | ∞ | 0.70 | 1.51000 | 60.0 |
| 2 | ∞ | (Variable) | | |
| 3 | −65.913 | 3.14 | 2.00069 | 25.5 |
| 4 | −48.248 | 10.11 | | |
| 5 | −34.250 | 3.19 | 1.76182 | 26.5 |
| 6 | −1000.301 | 1.69 | | |
| 7* | −4010.368 | 6.95 | 1.58313 | 59.4 |
| 8* | −44.146 | 1.21 | | |
| 9* | 161.388 | 5.20 | 1.63550 | 23.8 |
| 10* | 44.387 | 1.20 | | |
| 11 | 64.814 | 8.88 | 1.83481 | 42.7 |
| 12 | −64.313 | 27.00 | | |
| 13 (Eye Point) | | | | |

Aspheric Surface Data

7th Surface

K = 1.33592e+004   A4 = −7.84416e−006   A6 = 7.50739e−009

8th Surface

K = −6.98689e−001   A4 = 3.30466e−006   A6 = −8.53288e−009

9th Surface

K = −2.65944e+002   A4 = −3.33664e−006   A6 = −9.10796e−009

10th Surface

K = −9.09514e+000   A4 = −5.30646e−006   A6 = 3.91499e−009

Various data

| Diopter [diopter] | −2.0 | +0.7 | −3.3 |
|---|---|---|---|
| Focal Length | 61.32 | 61.32 | 61.32 |
| d2 | 21.46 | 31.12 | 17.55 |

Numerical Embodiment 3 (EX. 3)

Unit mm

Surface Data

| Surface Number | r | d | nd | vd |
|---|---|---|---|---|
| 1 | ∞ | 0.70 | 1.51000 | 60.0 |
| 2 | ∞ | (Variable) | | |
| 3 | −158.559 | 2.41 | 2.00069 | 25.5 |
| 4 | −77.911 | 20.00 | | |
| 5 | −30.833 | 8.00 | 1.95906 | 17.5 |
| 6 | −72.834 | 3.39 | | |
| 7 | 188.533 | 7.00 | 1.83481 | 42.7 |
| 8 | −56.340 | 1.20 | | |
| 9 | 40.450 | 1.71 | 1.84666 | 23.8 |
| 10 | 23.822 | 1.20 | | |
| 11 | 25.956 | 4.79 | 1.91082 | 35.3 |
| 12 | 64.549 | 27.00 | | |
| 13 (Eye Point) | | | | |

Various Data

| Diopter [diopter] | −2.0 | +2.0 | −4.0 |
|---|---|---|---|
| Focal Length | 52.34 | 52.34 | 52.34 |
| d2 | 11.05 | 21.99 | 6.18 |

Numerical Embodiment 4 (EX. 4)

Unit mm

Surface Data

| Surface Number | r | d | nd | vd |
|---|---|---|---|---|
| 1 | ∞ | 0.70 | 1.51000 | 60.0 |
| 2 | ∞ | (Variable) | | |
| 3* | −98.827 | 11.19 | 1.85135 | 40.1 |
| 4* | −71.371 | 20.00 | | |
| 5* | −49.765 | 3.00 | 1.63550 | 23.8 |
| 6* | −407.575 | 1.11 | | |
| 7* | −1171.461 | 7.94 | 1.49171 | 57.4 |
| 8* | −82.367 | 1.20 | | |
| 9* | 219.883 | 3.76 | 1.63550 | 23.8 |
| 10* | 74.863 | 1.23 | | |
| 11* | 95.021 | 8.12 | 1.80610 | 40.7 |
| 12* | −92.616 | 27.00 | | |
| 13 (Eye Point) | | | | |

Aspheric Surface Data

3rd Surface

K = 4.54099e−001   A4 = 3.40725e−008   A6 = 7.53032e−011
A8 = −1.51639e−013

4th Surface

K = 3.40970e−001   A4 = 8.48720e−008   A6 = −4.76459e−011
A8 = 1.79616e−014

5th Surface

K = 3.53841e−001

6th Surface

K = −1.00057e+003

7th Surface

K = −2.99780e+003   A4 = −5.75156e−006   A6 = 7.03535e−009

8th Surface

K = −1.18365e+000   A4 = 4.34382e−006   A6 = −5.53385e−009

9th Surface

K = 1.75400e+001   A4 = −2.52412e−006   A6 = −7.75632e−009

10th Surface

K = −1.05760e+001   A4 = −6.88282e−006   A6 = 3.02568e−009

11th Surface

K = 3.83428e+000

12th Surface

K = 1.63448e+000

Various Data

| Diopter [diopter] | −2.0 | +2.0 | −4.0 |
|---|---|---|---|
| Focal Length | 91.98 | 91.98 | 91.98 |
| d2 | 31.59 | 66.08 | 20.00 |

Numerical Embodiment 5 (EX. 5)

Unit mm

Surface Data

| Surface Number | r | d | nd | vd |
|---|---|---|---|---|
| 1 | ∞ | 0.70 | 1.51000 | 60.0 |
| 2 | ∞ | (Variable) | | |
| 3* | 166.099 | 9.26 | 1.53110 | 55.9 |

-continued

Unit mm

| | | | | |
|---|---|---|---|---|
| 4* | −34.164 | 6.60 | | |
| 5* | −28.931 | 3.82 | 1.63550 | 23.8 |
| 6* | −93.400 | 0.47 | | |
| 7* | −153.697 | 3.79 | 1.53110 | 55.9 |
| 8* | −50.254 | 2.12 | | |
| 9* | −40.174 | 6.83 | 1.63550 | 23.8 |
| 10* | −56.296 | 1.20 | | |
| 11 | −3131.870 | 4.55 | 1.53110 | 55.9 |
| 12 | −62.412 | 1.20 | | |
| 13 | 110.718 | 3.36 | 1.49700 | 81.5 |
| 14 | −332.326 | 27.00 | | |
| 15 (Eye Point) | | | | |

Aspheric Surface Data

3rd Surface

K = −9.59406e+001  A4 = −2.43307e−006  A6 = −5.82983e−009

4th Surface

K = 3.24062e−001  A4 = 2.14830e−006  A6 = 2.81943e−009

5th Surface

K = 9.32664e−002  A4 = −5.63898e−007  A6 = 2.57659e−008

6th Surface

K = −8.05489e+000  A4 = 6.49218e−007  A6 = −1.63252e−010

7th Surface

K = −4.96939e+001  A4 = −1.17845e−006  A6 = −4.58865e−009

8th Surface

K = 2.90402e−001  A4 = −2.46377e−006  A6 = 5.28440e−009

9th Surface

K = −1.87452e−001  A4 = 1.66992e−006  A6 = −7.39182e−009

10th Surface

K = 2.96336e+000  A4 = 4.16642e−007  A6 = 1.08928e−009

Various Data

| Diopter [diopter] | −2.0 | +2.0 | −4.0 |
|---|---|---|---|
| Focal Length | 52.34 | 52.34 | 52.34 |
| d2 | 22.29 | 33.23 | 17.21 |

Numerical Embodiment 6 (EX. 6)

Unit mm

Surface Data

| Surface Number | r | d | nd | vd |
|---|---|---|---|---|
| 1 | ∞ | 0.70 | 1.51000 | 60.0 |
| 2 | ∞ | (Variable) | | |
| 3 | −1201.003 | 20.00 | 1.48749 | 70.2 |
| 4 | −89.718 | 20.00 | | |
| 5* | −64.550 | 3.06 | 1.63550 | 23.8 |
| 6* | −160.023 | 2.00 | | |
| 7* | −230.109 | 3.54 | 1.53110 | 55.9 |
| 8* | −119.762 | 1.20 | | |
| 9* | −86.800 | 12.72 | 1.63550 | 23.8 |
| 10* | −103.753 | 1.20 | | |
| 11 | 5354.752 | 4.23 | 1.60311 | 60.6 |
| 12 | −123.568 | 1.20 | | |
| 13 | 178.678 | 3.96 | 1.49700 | 81.5 |
| 14 | −351.151 | 27.00 | | |
| 15 (Eye Point) | | | | |

-continued

Unit mm

Aspheric Surface Data

5th Surface

K = 2.64919e+000  A4 = −7.42759e−007

6th Surface

K = −6.77987e+001  A4 = −2.49183e−008

7th Surface

K = 6.98083e+001  A4 = −1.18509e−006

8th Surface

K = 5.02189e+000  A4 = −2.98254e−006  A6 = −1.01200e−009

9th Surface

K = 2.92913e+000  A4 = 1.34769e−006

10th Surface

K = 1.50370e+000  A4 = −8.31493e−007

Various Data

| Diopter [diopter] | −2.0 | +2.0 | −4.0 |
|---|---|---|---|
| Focal Length | 104.68 | 104.68 | 104.68 |
| d2 | 32.12 | 76.83 | 17.13 |

Numerical Embodiment 7 (EX. 7)

Unit mm

Surface Data

| Surface Number | R | d | nd | vd |
|---|---|---|---|---|
| 1 | ∞ | 0.70 | 1.51000 | 60.0 |
| 2 | ∞ | (Variable) | | |
| 3* | 136.125 | 8.69 | 1.69350 | 53.2 |
| 4* | −43.222 | 8.67 | | |
| 5* | −28.738 | 3.00 | 1.63550 | 23.8 |
| 6* | −89.027 | 0.30 | | |
| 7* | −231.429 | 5.74 | 1.53110 | 55.9 |
| 8* | −46.578 | 2.68 | | |
| 9* | −39.537 | 2.66 | 1.63550 | 23.8 |
| 10* | −55.894 | 1.84 | | |
| 11* | −2299.162 | 5.94 | 1.53110 | 55.9 |
| 12* | −60.213 | 1.20 | | |
| 13 | 110.718 | 4.00 | 1.55332 | 71.7 |
| 14 | −332.326 | 27.00 | | |
| 15 (Eye Point) | | | | |

Aspheric Surface Data

3rd Surface

K = −6.07439e+000  A4 = −1.82896e−006  A6 = −5.07089e−009

4th Surface

K = 5.99930e−001  A4 = 1.41427e−006  A6 = 4.25770e−010

5th Surface

K = 1.13826e−001  A4 = −6.11987e−007  A6 = 2.58066e−008

6th Surface

K = −7.86704e+000  A4 = 6.27492e−007  A6 = −5.81898e−010

7th Surface

K = −3.07481e+001  A4 = −8.80513e−007  A6 = −3.57889e−009

8th Surface

K = 5.53963e−001  A4 = −2.76657e−006  A6 = 4.45282e−009

-continued

| Unit mm | | |
|---|---|---|
| 9th Surface | | |
| K = −1.40844e−001 | A4 = 1.47140e−006 | A6 = −7.32877e−009 |
| 10th Surface | | |
| K = 3.06010e+000 | A4 = 6.99258e−007 | A6 = 1.21727e−009 |
| 11th Surface | | |
| K = 1.00225e+004 A8 = 9.72106e−013 | A4 = −2.66396e−007 | A6 = 8.58565e−011 |
| 12th Surface | | |
| K = −3.51427e−001 A8 = −4.05287e−013 | A4 = 2.36708e−007 | A6 = 2.33340e−010 |

| Various Data | | | |
|---|---|---|---|
| Diopter [diopter] | −2.0 | +2.0 | −4.0 |
| Focal Length | 45.99 | 45.99 | 45.99 |
| d2 | 19.29 | 27.62 | 15.12 |

Numerical Embodiment 8 (EX. 8)

| Unit mm | | | |
|---|---|---|---|
| Surface Data | | | |
| Surface Number | r | d | nd | vd |
| 1 | ∞ | 0.70 | 1.51633 | 64.1 |
| 2 | ∞ | (Variable) | | |
| 3 | 547.471 | 4.04 | 1.71300 | 53.9 |
| 4 | −23.889 | 2.74 | | |
| 5 | −14.779 | 1.14 | 1.69895 | 30.1 |
| 6 | 39.283 | 9.03 | 1.91082 | 35.3 |
| 7 | −24.063 | (Variable) | | |
| 8 | −16.665 | 1.09 | 1.80809 | 22.8 |
| 9 | −94.061 | 4.60 | 1.83481 | 42.7 |
| 10 | −22.997 | 0.17 | | |
| 11 | 184.850 | 2.92 | 1.88300 | 40.8 |
| 12 | −58.904 | 27.00 | | |
| 13 (Eye Point) | | | | |

| Various Data | | | |
|---|---|---|---|
| Diopter [diopter] | −2.0 | +2.4 | −5.8 |
| Focal Length | 28.97 | 29.87 | 27.10 |
| d2 | 6.58 | 9.93 | 4.95 |
| d7 | 8.39 | 10.64 | 3.20 |

Numerical Embodiment 9 (EX. 9)

| Unit mm | | | |
|---|---|---|---|
| Surface Data | | | |
| Surface Number | r | d | nd | vd |
| 1 | ∞ | 0.70 | 1.51000 | 60.0 |
| 2 | ∞ | (Variable) | | |
| 3* | 85.611 | 7.93 | 1.63278 | 23.3 |
| 4* | −73.248 | 11.44 | | |
| 5* | −38.173 | 2.99 | 1.63550 | 23.8 |
| 6 | ∞ | 2.00 | | |
| 7 | −50.000 | 2.00 | 1.63550 | 23.8 |
| 8* | 63.180 | 1.08 | | |
| 9 | 80.000 | 3.73 | 1.83481 | 42.7 |
| 10 | −120.000 | 3.63 | | |

| Unit mm | | | |
|---|---|---|---|
| 11* | 44.916 | 11.36 | 1.53110 | 55.9 |
| 12* | −38.064 | 27.00 | | |
| 13 (Eye Point) | | | | |

| Aspheric Surface Data | | |
|---|---|---|
| 3rd Surface | | |
| K = −3.90666e+001 | A4 = 1.18895e−005 | A6 = −1.59624e−008 |
| 4th Surface | | |
| K = 1.15096e+001 | A4 = 8.63593e−006 | A6 = −4.12233e−009 |
| 5th Surface | | |
| K = −1.92831e+000 | A4 = −7.44051e−006 | A6 = −6.66949e−008 |
| 8th Surface | | |
| K = 6.40443e+000 | A4 = −1.12216e−005 | A6 = −5.11268e−008 |
| 11th Surface | | |
| K = 6.47203e−001 | A4 = −1.83397e−005 | A6 = −3.67313e−008 |
| 12th Surface | | |
| K = −4.15340e+000 | A4 = −1.79314e−005 | A6 = 8.95990e−009 |

| Various Data | | | |
|---|---|---|---|
| Diopter [diopter] | −2.0 | +2.0 | −4.0 |
| Focal Length | 52.35 | 52.35 | 52.35 |
| d2 | 12.84 | 23.84 | 7.81 |

Numerical Embodiment 10 (EX. 10)

| Unit mm | | | |
|---|---|---|---|
| Surface Data | | | |
| Surface Number | r | d | nd | vd |
| 1 | ∞ | 0.70 | 1.51000 | 60.0 |
| 2 | ∞ | (Variable) | | |
| 3* | −38.535 | 14.01 | 1.63278 | 23.3 |
| 4* | −29.517 | 1.20 | | |
| 5* | 24.703 | 7.75 | 1.53110 | 55.9 |
| 6* | −192.936 | 1.07 | | |
| 7* | −230.075 | 4.76 | 1.63550 | 23.8 |
| 8* | 18.027 | 8.01 | | |
| 9* | 37.444 | 3.24 | 1.63550 | 23.8 |
| 10* | 30.304 | 3.65 | | |
| 11* | 53.230 | 10.15 | 1.53110 | 55.9 |
| 12* | −35.174 | 27.00 | | |
| 13 (Eye Point) | | | | |

| Aspheric Surface Data | | |
|---|---|---|
| 3rd Surface | | |
| K = −2.22441e+000 | | |
| 4th Surface | | |
| K = −1.18255e+000 | | |
| 5th Surface | | |
| K = −1.32449e+000 | A4 = 7.79653e−006 | A6 = −2.68440e−008 |
| 6th Surface | | |
| K = 2.37035e+001 | A4 = 5.59136e−006 | A6 = 2.14521e−008 |
| 7th Surface | | |
| K = 1.36735e+002 | A4 = 8.57582e−006 | A6 = 1.39697e−008 |
| 8th Surface | | |
| K = −1.09087e+000 | A4 = 4.16185e−005 | A6 = −1.08061e−007 |

-continued

Unit mm

9th Surface

K = −1.50678e+001   A4 = 8.86960e−006   A6 = 1.79036e−008

10th Surface

K = −1.08863e+001   A4 = −3.03939e−006   A6 = 3.51421e−008

11th Surface

K = −1.20352e+000

12th Surface

K = 3.09095e−001

Various Data

| Diopter [diopter] | −2.0 | +2.5 | −6.0 |
|---|---|---|---|
| Focal Length | 52.34 | 52.34 | 52.34 |
| d2 | 15.82 | 28.22 | 5.80 |

Numerical Embodiment 11 (EX. 11)

Unit mm

Surface Data

| Surface Number | r | d | nd | vd |
|---|---|---|---|---|
| 1 | ∞ | 0.70 | 1.51000 | 60.0 |
| 2 | ∞ | (Variable) | | |
| 3 | −52.901 | 3.89 | 2.00069 | 25.5 |
| 4 | −21.121 | 3.61 | | |
| 5* | −13.287 | 2.00 | 1.63550 | 23.8 |
| 6 | −295.010 | 0.20 | | |
| 7 | 112.818 | 1.52 | 1.49171 | 57.4 |
| 8* | 109.641 | 0.30 | | |
| 9* | 48.133 | 6.44 | 1.53110 | 55.9 |
| 10* | −21.455 | 1.20 | | |
| 11* | 395.724 | 1.20 | 1.63550 | 23.8 |
| 12* | 22.567 | 1.20 | | |
| 13 | 39.762 | 8.07 | 1.83481 | 42.7 |
| 14 | −39.762 | 27.00 | | |
| 15 (Eye Point) | | | | |

Aspheric Surface Data

5th Surface

K = −7.56869e−001   A4 = −5.88991e−005   A6 = 2.21474e−007

8th Surface

K = 4.38705e+001   A4 = −1.19423e−005   A6 = −6.22491e−008

9th Surface

K = −4.78924e+000   A4 = −2.40504e−005   A6 = −2.98503e−008

10th Surface

K = −1.90079e+000   A4 = −1.90004e−007   A6 = 3.37043e−008

11th Surface

K = −3.09759e+003   A4 = −8.85806e−007   A6 = −7.73712e−010

12th Surface

K = −4.48834e+000   A4 = 3.15962e−006   A6 = 1.14086e−009

Various Data

| Diopter [diopter] | −2.0 | +2.5 | −6.0 |
|---|---|---|---|
| Focal Length | 28.56 | 28.56 | 28.56 |
| d2 | 9.12 | 12.78 | 5.80 |

Numerical Embodiment 12 (EX. 12)

Unit mm

Surface Data

| Surface Number | r | d | nd | vd |
|---|---|---|---|---|
| 1 | ∞ | 0.70 | 1.51000 | 60.0 |
| 2 | ∞ | (Variable) | | |
| 3 | −18.559 | 1.00 | 1.64769 | 33.8 |
| 4 | 405.260 | 8.54 | 1.69350 | 53.2 |
| 5* | −30.810 | 1.18 | | |
| 6* | 161.494 | 7.67 | 1.49171 | 57.4 |
| 7 | −38.921 | 0.10 | | |
| 8* | 48.932 | 8.43 | 1.49171 | 57.4 |
| 9 | −97.046 | 0.10 | | |
| 10 | 33.326 | 1.20 | 1.69895 | 30.1 |
| 11 | 22.887 | 30.00 | | |
| 12 (Eye Point) | | | | |

Aspheric Surface Data

5th Surface

K = −6.54146e−003

6th Surface

K = −2.64204e+002   A4 = −3.16425e−006   A6 = −2.31819e−009

8th Surface

K = 1.87604e+000

Various Data

| Diopter [diopter] | −2.0 | +2.5 | 6.0 |
|---|---|---|---|
| Focal Length | 50.29 | 50.29 | 50.29 |
| d2 | 28.47 | 40.02 | 20.00 |

TABLE 1

| | Ex. 1 | Ex. 2 | Ex. 3 | Ex. 4 |
|---|---|---|---|---|
| f1/f3 | 1.09 | 2.16 | 2.86 | 1.41 |
| f3/f5 | 1.20 | 1.92 | 1.17 | 3.03 |
| f5/f | 0.86 | 0.65 | 0.86 | 0.65 |
| vd2 | 23.8 | 26.5 | 17.5 | 23.8 |
| vd4 | 23.8 | 23.8 | 23.8 | 23.8 |
| H/f | 0.64 | 0.83 | 0.73 | 0.83 |

TABLE 2

| | Ex. 1 | Ex. 2 | Ex. 3 | Ex. 4 | Ex. 5 | Ex. 6 | Ex. 7 | Ex. 8 |
|---|---|---|---|---|---|---|---|---|
| (R21 + R32)/(R21 − R32) | −4.80 | −7.92 | −3.42 | −4.05 | −3.71 | −3.34 | −4.22 | −4.18 |
| f2/f3 | −0.67 | −0.61 | −1.17 | −0.50 | −0.49 | −0.37 | −0.63 | −0.87 |
| vd2 | 23.8 | 26.5 | 17.5 | 23.8 | 23.8 | 23.8 | 23.8 | 30.1 |
| vd4 | 23.8 | 23.8 | 23.8 | 23.8 | 23.8 | 23.8 | 23.8 | 22.8 |
| H/f | 0.64 | 0.83 | 0.73 | 0.83 | 0.73 | 0.73 | 0.83 | 0.64 |

TABLE 3

| | Ex. 1 | Ex. 2 | Ex. 3 | Ex. 4 | Ex. 9 | Ex. 10 | Ex. 11 |
|---|---|---|---|---|---|---|---|
| fe/f | 0.86 | 0.65 | 0.86 | 0.65 | 0.78 | 0.79 | 0.87 |
| ff/fe | 1.30 | 4.14 | 3.35 | 4.28 | 1.56 | 3.00 | 1.33 |
| vdn | 23.8 | 26.5 | 17.5 | 23.8 | 23.8 | 23.8 | 23.8 |
| | 23.8 | 23.8 | 23.8 | 23.8 | 23.8 | 23.8 | 57.4 |
| | | | | | | | 23.8 |
| Rf2/Re1 | −0.57 | −0.74 | −3.00 | −0.75 | −1.63 | −0.55 | −0.53 |
| H/f | 0.64 | 0.83 | 0.73 | 0.83 | 0.63 | 0.73 | 0.64 |

TABLE 4

|  | Ex. 1 | Ex. 4 | Ex. 5 | Ex. 6 | Ex. 7 | Ex. 9 | Ex. 10 | Ex. 12 |
|---|---|---|---|---|---|---|---|---|
| \|Sagmax/RS\| | 0.072 | 0.033 | 0.008 | 0.016 | 0.072 | 0.033 | 0.187 | 0.008 |
| \|Sagmax/fS\| | 0.038 | 0.014 | 0.024 | 0.004 | 0.031 | 0.036 | 0.129 | 0.020 |
| ER/f | 0.95 | 0.29 | 0.52 | 0.26 | 0.59 | 0.52 | 0.52 | 0.60 |
| vdn | 23.8 | 23.8 | 23.8 | 23.8 | 23.8 | 23.8 | 23.8 | 33.8 |
|  | 23.8 | 23.8 | 23.8 | 23.8 | 23.8 | 23.8 | 23.8 | 30.1 |
| H/f | 0.64 | 0.83 | 0.73 | 0.73 | 0.83 | 0.63 | 0.73 | 0.64 |

Next, an exemplary embodiment of a video camera including the eyepiece lens illustrated in each exemplary embodiment will be described with reference to FIG. 25.

In FIG. 25, the video camera includes a video camera body 10, a photographic optical system 11 forming an object image on an image sensor (not illustrated), and a sound collection microphone 12. An observation apparatus (electronic viewfinder) 13 is used to observe an object image displayed on an image display device (not illustrated) through the eyepiece lens according to at least one embodiment of the present disclosure. The image display device is constituted by a liquid crystal panel or the like, and displays an object image or the like formed by the photographic optical system 11.

While the present inventions have been described with reference to exemplary embodiments, it is to be understood that the inventions are not limited to the disclosed exemplary embodiments. The scope of the following claims is to be accorded the broadest interpretation so as to encompass all such modifications and equivalent structures and functions.

This application claims the benefit of Japanese Patent Application No. 2014-176291, filed Aug. 29, 2014, Japanese Patent Application No. 2014-176293, filed Aug. 29, 2014, Japanese Patent Application No. 2014-176294, filed Aug. 29, 2014, and Japanese Patent Application No. 2014-176295, filed Aug. 29, 2014, which applications are hereby incorporated by reference herein in their entireties.

What is claimed is:

1. An eyepiece lens consisting of:
a first lens having a positive refractive power;
a second lens having a negative refractive power disposed adjacent to an observation side of the first lens;
a third lens having a positive refractive power disposed adjacent to an observation side of the second lens;
a fourth lens having a negative refractive power disposed adjacent to an observation side of the third lens; and
a fifth lens having a positive refractive power disposed adjacent to an observation side of the fourth lens,
wherein a focal length of the fifth lens is shorter than a focal length of the third lens, and the focal length of the third lens is shorter than a focal length of the first lens, and
wherein the following conditional expression is satisfied:

$0.53 < f5/f < 0.95$, where a focal length of the eyepiece lens is defined as f, and the focal length of the fifth lens is defined as f5.

2. The eyepiece lens according to claim 1,
wherein the following conditional expression is satisfied:

$1.00 < f1/f3 < 3.15$, where the focal length of the first lens is defined as f1, and the focal length of the third lens is defined as f3.

3. The eyepiece lens according to claim 1,
wherein the following conditional expression is satisfied:

$1.00 < f3/f5 < 3.33$, where the focal length of the third lens is defined as f3.

4. The eyepiece lens according to claim 1,
wherein the following conditional expression is satisfied:

$4.0 < vd2 < 29.2$, where an Abbe number of a material of the second lens is defined as vd2.

5. The eyepiece lens according to claim 1,
wherein the following conditional expression is satisfied:

$4.0 < vd4 < 29.2$, where an Abbe number of a material of the fourth lens is defined as vd4.

6. The eyepiece lens according to claim 1,
wherein the first lens, the second lens, the third lens, the fourth lens, and the fifth lens integrally move in diopter adjustment.

7. An observation apparatus comprising:
an image display device configured to display an image; and
an eyepiece lens used to observe an image displayed on an image display surface of the image display device, the eyepiece lens consisting of a first lens having a positive refractive power, a second lens having a negative refractive power disposed adjacent to an observation side of the first lens, a third lens having a positive refractive power disposed adjacent to an observation side of the second lens, a fourth lens having a negative refractive power disposed adjacent to an observation side of the third lens, and a fifth lens having a positive refractive power disposed adjacent to an observation side of the fourth lens,
wherein a focal length of the fifth lens is shorter than a focal length of the third lens, and the focal length of the third lens is shorter than a focal length of the first lens, and
wherein the following conditional expressions are satisfied:

$0.52 < H/f < 0.91$, and $0.53 < f5/f < 0.95$, where a focal length of the eyepiece lens is defined as f, a diagonal length of the image display surface is defined as H, and the focal length of the fifth lens is defined as f5.

8. An imaging apparatus comprising:
an image sensor;
a photographic optical system configured to form an object image on the image sensor;
an image display device configured to display the object image; and
an eyepiece lens used to observe an object image displayed on an image display surface of the image display device, the eyepiece lens consisting of a first lens having a positive refractive power, a second lens having a negative refractive power disposed adjacent to an observation side of the first lens, a third lens having a positive refractive power disposed adjacent to an observation side of the second lens, a fourth lens having a negative refractive power disposed adjacent to an observation side of the third lens, and a fifth lens having a positive refractive power disposed adjacent to an observation side of the fourth lens, wherein a focal length of the fifth lens is shorter than a focal length of the third lens, and the focal length of the third lens is shorter than a focal length of the first lens, and wherein the following conditional expression is satisfied:

$$0.53 < f5/f < 0.95,$$

where a focal length of the eyepiece lens is defined as f, and the focal length of the fifth lens is defined as f5.

9. The eyepiece lens according to claim 1, wherein the first lens has a concave object side surface and a convex observation side surface.

10. The eyepiece lens according to claim 9, wherein:
(i) the second lens has one of: a concave object side surface and a concave observation side surface, a concave object side surface and a convex observation side surface, and at least a concave object side surface;
(ii) the third lens has one of: a convex object side surface and a convex observation side surface, a concave object side surface and a convex observation side surface, and at least a convex observation side surface;
(iii) the fourth lens has one of: a concave object side surface and a concave observation side surface, and a convex object side surface and a concave observation side surface; and
(iv) the fifth lens has one of: a convex object side surface and a convex observation side surface, and a convex object side surface and a concave observation side surface.

* * * * *